United States Patent
Wakazono et al.

(10) Patent No.: US 7,834,915 B2
(45) Date of Patent: Nov. 16, 2010

(54) IMAGE PROCESSING APPARATUS, IMAGING APPARATUS, IMAGING PROCESSING METHOD, AND COMPUTER PROGRAM

(75) Inventors: Masafumi Wakazono, Tokyo (JP); Naoya Katoh, Chiba (JP)

(73) Assignee: Sony Corporation, Tokyo (JP)

( * ) Notice: Subject to any disclaimer, the term of this patent is extended or adjusted under 35 U.S.C. 154(b) by 567 days.

(21) Appl. No.: 11/907,201

(22) Filed: Oct. 10, 2007

(65) Prior Publication Data

US 2008/0187235 A1 Aug. 7, 2008

(30) Foreign Application Priority Data

Oct. 19, 2006 (JP) .............................. 2006-285108

(51) Int. Cl.
*H04N 5/235* (2006.01)
*H04N 5/238* (2006.01)

(52) U.S. Cl. .................................... 348/229.1; 348/364
(58) Field of Classification Search ........................ None
See application file for complete search history.

(56) References Cited

U.S. PATENT DOCUMENTS

| 7,612,805 B2 * | 11/2009 | Solomon ................. 348/222.1 |
| 2005/0206750 A1 * | 9/2005 | Aoyagi et al. ............... 348/238 |
| 2005/0212955 A1 * | 9/2005 | Craig et al. ................ 348/362 |
| 2009/0040364 A1 * | 2/2009 | Rubner ....................... 348/362 |

FOREIGN PATENT DOCUMENTS

JP 2003-248438 12/2003

* cited by examiner

*Primary Examiner*—Justin P Misleh
(74) *Attorney, Agent, or Firm*—Rader, Fishman & Grauer PLLC

(57) ABSTRACT

An image processing apparatus that processes input image data includes an exposure-correction-value acquiring unit that acquires exposure correction values at plural stages with respect to an exposure control value during imaging of the input image data, an illumination-component generating unit that generates illumination components on the basis of the input image data, a gain-amount calculating unit that multiplies each of plural weighting coefficients with a multiplication coefficient corresponding to the exposure correction value corresponding to the weighting coefficient and adds up multiplied values to calculate a gain amount, and a gain applying unit that applies, for each of pixels, the gain amount calculated by the gain-amount calculating unit to the input image data.

27 Claims, 19 Drawing Sheets

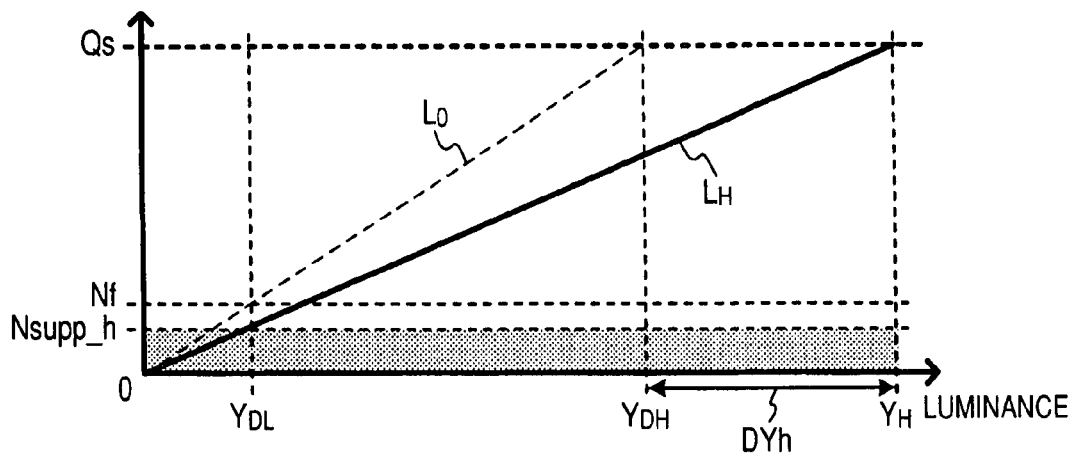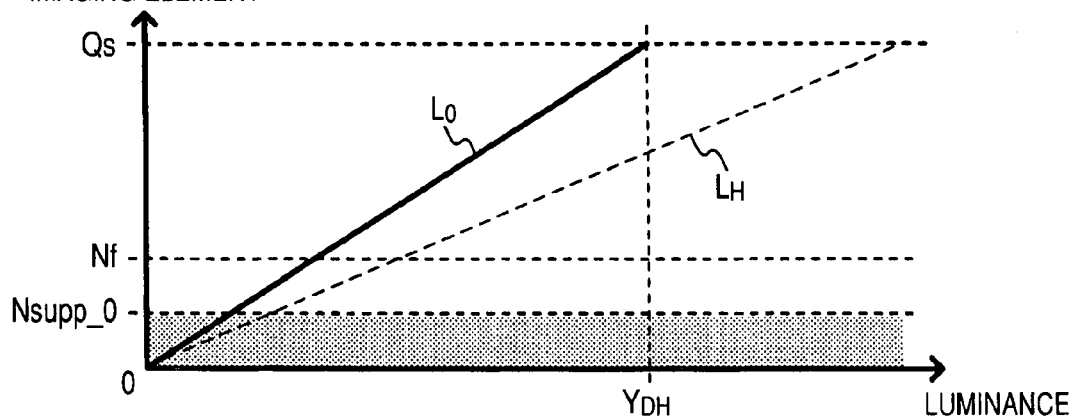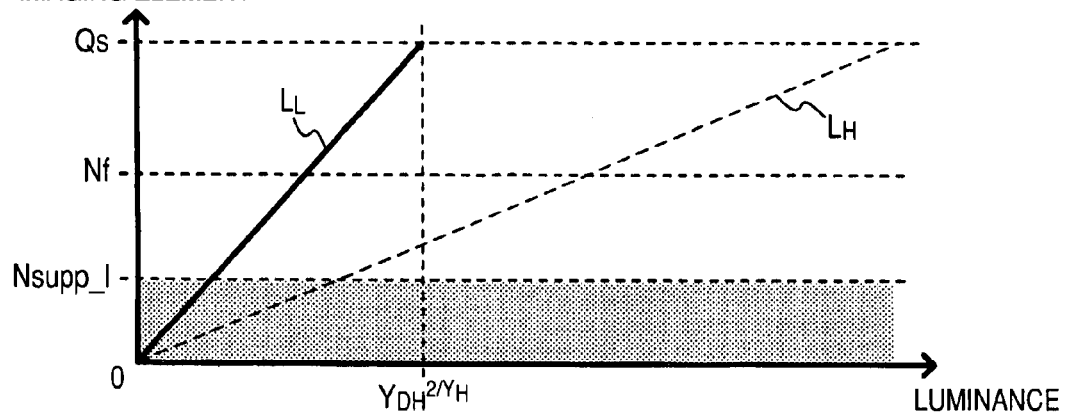

IMAGE PROCESSING APPARATUS, IMAGING APPARATUS, IMAGING PROCESSING METHOD, AND COMPUTER PROGRAM

CROSS-REFERENCES TO RELATED APPLICATIONS

The present invention contains subject matter related to Japanese Patent Application JP 2006-285108 filed in the Japanese Patent Office on Oct. 19, 2006, the entire contents of which being incorporated herein by reference.

BACKGROUND OF THE INVENTION

1. Field of the Invention

The present invention relates to an image processing apparatus that processes input image data, an imaging apparatus that has functions of the image processing apparatus, an image processing method, and a computer program, and, more particularly to an image processing apparatus, an imaging apparatus, an image processing method, and a computer program suitable for processing of image data in which a scene having a relatively wide luminance range is imaged.

2. Description of the Related Art

With a digital still camera (DSC) employing a solid state imaging element, an image acquired by imaging can be recorded on a recording medium such as a flash memory as digital image data. The image can be displayed on a monitor or printed from a printer on the basis of the recorded digital image data.

During imaging in such a DSC, it is possible to obtain image data having a desired quality by applying AE (Auto Exposure) processing, AWB (Auto White Balance) processing, gradation correction processing, and the like to an imaged image in the DSC. When the AE processing is performed, a luminance of a subject is measured by, for example, a method of dividing an angle of view of the imaged image into plural areas and setting a weighted average luminance of luminances in the respective areas as the luminance of the subject or setting a luminance at a focus point as the luminance of the subject. An exposure amount is determined by adjusting an exposure time, an aperture of a stop, and an ISO (International Standards Organization) gain on the basis of the measured result.

However, in a scene having a wide luminance range in an angle of view, it is highly likely that the accuracy of the AE processing is deteriorated, a main subject in the angle of view is excessively exposed to light to cause white void in an image or is insufficiently exposed to light to cause drowning of an image in noise or black solid in the image. As an imaging method for obtaining an image imaged under an appropriate exposure condition even in such a scene, there is known a method called "bracket imaging" for exposing a subject to light plural times in a row by changing an exposure condition and obtaining plural image signals under the changed exposure conditions. For example, there is known an image photographing method for automatically setting appropriate conditions during bracket imaging on the basis of photometry results (see, for example, JP-A-2003-348438 (paragraphs 0047 to 0050 and FIG. 3).

However, even if the exposure condition is appropriately set, when a dynamic range of an output of an imaging element is insufficient with respect to a luminance range of the scene, white void or black solid occurs to deteriorate an image quality. In other words, in respective images obtained by the bracket imaging, it is difficult to reproduce illumination components exceeding the dynamic range of the output of the imaging element.

Therefore, an imaging method that makes it possible to obtain an image having a dynamic range wider than an output of an imaging element (a high dynamic range image) by applying the bracket imaging has been considered. In the imaging of the high dynamic range image, an imaged image with a large exposure amount and an imaged image with a low exposure amount are acquired by the bracket imaging and combined to generate an image having a high dynamic range. In other words, an image component in which gradation on a high luminance side is obtained by holding down an exposure amount and an image component in which gradation on a low luminance side is obtained by increasing an exposure amount are combined. This makes it possible to incorporate gradation information in a wide luminance range, which may be unable to be obtained in one exposure, in an image after the combination. There is also proposed a method of providing, instead of using a bracket imaging function, two kinds of large and small apertures on an imaging element and combining outputs detected in areas of the respective apertures to obtain a high dynamic range image.

SUMMARY OF THE INVENTION

However, in performing effective bracket imaging, in particular, in performing bracket imaging on condition that a high dynamic range image is acquired, it is difficult to determine an exposure condition during the bracket imaging. In acquiring a high dynamic range image with the bracket imaging, if a camera is out of focus or a subject is moving when the bracket imaging is performed, it is difficult to correctly combine obtained images and a quality of the high dynamic range image is deteriorated. Therefore, it is demanded to make it possible to generate a high dynamic range image in one exposure. However, an effective method meeting the demand has not been considered.

Image data processed in an imaging apparatus and a high dynamic range image generated by the imaging apparatus often have the number of bits larger than that of image data that can be treated by a display device. Thus, a procedure for compressing a gradation range is often necessary. As a result, a processing procedure that can optimize a gradation range without spoiling a quality of an input image has been demanded.

Therefore, it is desirable to provide an image processing apparatus, an imaging apparatus, an image processing method, and a computer program that can optimize a luminance range of input image data.

According to an embodiment of the present invention there is provided an image processing apparatus that processes input image data, the image processing apparatus including an exposure-correction-value acquiring unit that acquires exposure correction values at plural stages with respect to an exposure control value during imaging of the input image data, an illumination-component generating unit that generates illumination components on the basis of the input image data, a gain-amount calculating unit that multiplies each of plural weighting coefficients, which are set by the number of stages of the exposure correction values acquired by the exposure-correction-value acquiring unit and set according to the brightness of pixels in an identical position of the illumination components such that a total value of the weighting coefficients in the pixels in the identical position is 1, with a multiplication coefficient corresponding to the exposure correction value corresponding to the weighting coefficient and adds up multiplied values to calculate a gain amount, and a gain applying unit that applies, for each of pixels, the gain amount calculated by the gain-amount calculating unit to the input image data.

In such an image processing apparatus, exposure correction values at plural stages with respect to an exposure control value during imaging of input image data are obtained by the exposure-correction-value acquiring unit and illumination components are generated by the illumination-component generating unit on the basis of the input image data. A gain amount of a gain applied to the input image data for each of pixels by the gain applying unit is calculated by the gain-amount calculating unit. The gain-amount calculating unit multiplies each of plural weighting coefficients, which are set by the number of stages of the exposure correction values acquired by the exposure-correction-value acquiring unit and set according to the brightness of pixels in an identical position of the illumination components such that a total value of the weighting coefficients in the pixels in the identical position is 1, by a multiplication coefficient corresponding to the exposure correction value corresponding to the weighting coefficient and adds up multiplied values to calculate a gain amount In the image processing apparatus according to the embodiments of the present invention, signal components obtained by adjusting an exposure amount of an input image are simulatively generated by applying multiplication coefficients corresponding to exposure correction values at plural stages to input image data. A combination ratio in an identical pixel of the signal components is given by weighting coefficients. The combination ratio is determined according to the brightness of illumination components. Therefore, it is possible to optimize a luminance range according to a brightness distribution of the illumination components.

BRIEF DESCRIPTION OF THE DRAWINGS

FIGS. 19A to 19C are diagrams showing characteristics of brightness in images generated by gain correction.

DESCRIPTION OF THE PREFERRED EMBODIMENTS

Embodiments of the present invention will be hereinafter explained in detail with reference to the accompanying drawings citing an example in which the present invention is applied to a digital still camera (DSC).

First Embodiment

Figure 1:
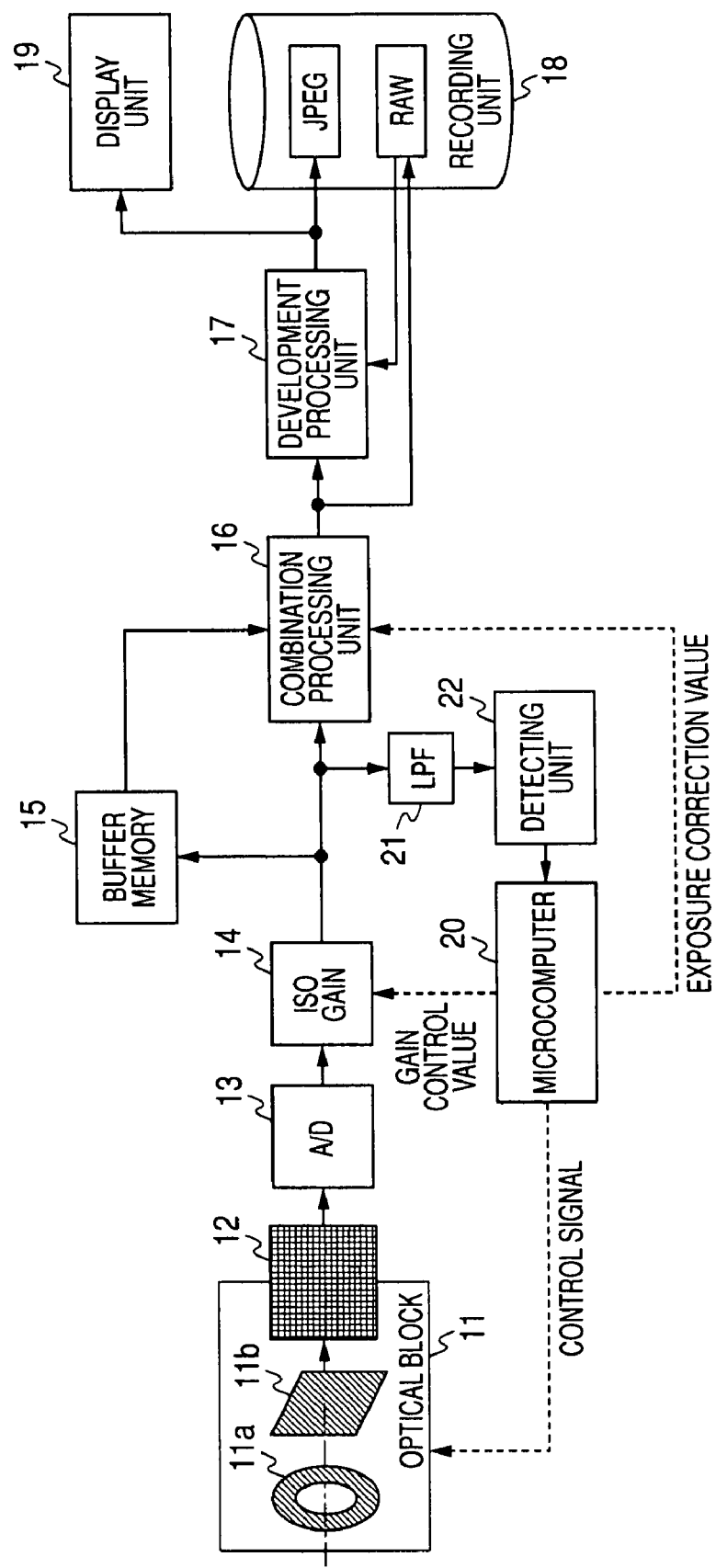
FIG. 1 is a block diagram showing an internal structure of a DSC according to a first embodiment of the present invention.

FIG. 1 is a block diagram showing an internal structure of a DSC according to a first embodiment of the present invention.

The DSC shown in FIG. 1 includes an optical block 11, an imaging element 12, an A/D (analog/digital) conversion unit 13, an ISO gain control unit 14, a buffer memory 15, a combination processing unit 16, a development processing unit 17, a recording unit 18, a display unit 19, a microcomputer 20, a low-pass filter (LPF) 21, and a detecting unit 22.

The optical block 11 includes a not-shown lens for condensing light from a subject on an imaging element 12, a not-shown driving mechanism for moving the lens to perform focusing and zooming, an aperture 11a, and a shutter 11b. The driving mechanism in the optical block 11 is driven according to a control signal from the microcomputer 20. The imaging element 12 is a solid state imaging element of, for example, a CCD (Charge Coupled Device) type or a CMOS (Complementary Metal Oxide Semiconductor) type and converts incident light from the subject into an electric signal.

The A/D conversion unit 13 converts an image signal outputted from the imaging element 12 into digital data. The ISO gain control unit 14 applies a uniform gain to respective components of RGB (Red, Green, and Blue) of image data from the A/D conversion unit 13 according to a gain control value from the microcomputer 20. The control of an ISO gain may be performed at a stage of an analog image signal before being inputted to the A/D conversion unit 13.

The buffer memory 15 temporarily stores data of plural images obtained by bracket imaging. The combination processing unit 16 receives an exposure correction value applied during the bracket imaging from the microcomputer 20 and combines the plural images in the buffer memory 15 into one image on the basis of this exposure correction value.

The development processing unit 17 is a block for executing so-called RAW development processing for mainly converting RAW image data outputted from the combination processing unit 16 into data of a visible image. The development processing unit 17 applies data interpolation (de-mosaic) processing, various kinds of color adjustment/conversion processing (white balance adjustment processing, high luminance knee compression processing, gamma correction processing, aperture correction processing, clipping processing, etc.), an image compression and encoding processing conforming to a predetermined encoding system (here, the JPEG (Joint Photographic Experts Group) is applied), and the like to the RAW image data.

In embodiments explained below, the number of bits of RAW image data outputted from the A/D conversion unit 13 is set to 12 bits and the development processing unit 17 can process the 12-bit data. In a process of development processing, the development processing unit 17 compresses the 12-bit data into 8-bit data according to, for example, the high luminance knee compression processing (or round-down of lower order bits) and applies compression and encoding processing to the 8-bit data. The development processing unit 17 outputs the 8-bit data to the display unit 19.

The recording unit 18 is a device for storing image data obtained by imaging as a data file. The recording unit 18 is realized as, for example, a portable flash memory or a HD (Hard Disk). In the recording unit 18, besides JPEG data encoded by the development processing unit 17, RAW image data outputted from the combination processing unit 16 can be recorded as a data file. The RAW image data recorded in the recording unit 18 can be read out, processed by the development processing unit 17, and recorded in the recording unit 18 as a JPEG data file anew.

The display unit 19 includes a monitor including an LCD (Liquid Crystal Display). The display unit 19 generates an image signal for monitor display on the basis of image data of an uncompressed state processed by the development processing unit 17 and supplies the image signal to the monitor. In a preview state before recording of an imaged image, an imaged image signal is continuously outputted from the imaging element 12. After being subjected to digital conversion, digital image data of the imaged image signal is supplied to the development processing unit 17 via the ISO gain control unit 14 and the combination processing unit 16 and subjected to development processing (excluding encoding processing). In this case, the display unit 19 displays images (preview images) sequentially outputted from the development processing unit 17 on the monitor. A user can visually recognize the preview images and check an angle of view.

The microcomputer 20 includes a CPU (Central Processing Unit), a ROM (Read only Memory), and a RAM (Random Access Memory). The microcomputer 20 collectively controls the entire DSC by executing a program stored on the ROM. For example, in this embodiment, the microcomputer 20 realizes AE control by calculating an exposure correction value on the basis of a detection result from the detecting unit 22 and outputting a control signal corresponding to the exposure correction value to control the aperture 11a and the shutter 11b. In performing high dynamic range imaging described later, the microcomputer 20 notifies the combination processing unit 16 of the calculated exposure correction value.

The LPF 21 applies low-pass filter processing to image data outputted from the ISO gain control unit 14 when necessary. The detecting unit 22 is a block for performing various kinds of detection on the basis of image data supplied from the ISO gain control unit 14 through the LPF 21. In this embodiment, for example, the detecting unit 22 divides an image into predetermined photometry areas and detects a luminance for each of the photometry areas.

An imaging operation, in particular, an operation of the high dynamic range imaging in this DSC is explained. The high dynamic range imaging (hereinafter referred to as HDR imaging) is an imaging method that makes it possible to obtain an image having gradation information in a luminance range wider than a luminance range in a scene detectable by the imaging element 12 (hereinafter referred to as HDR image). In the following explanation, an imaging operation mode for automatically discriminating, according to an imaging scene, whether the HDR imaging is necessary is set in the DSC.

Figure 2:
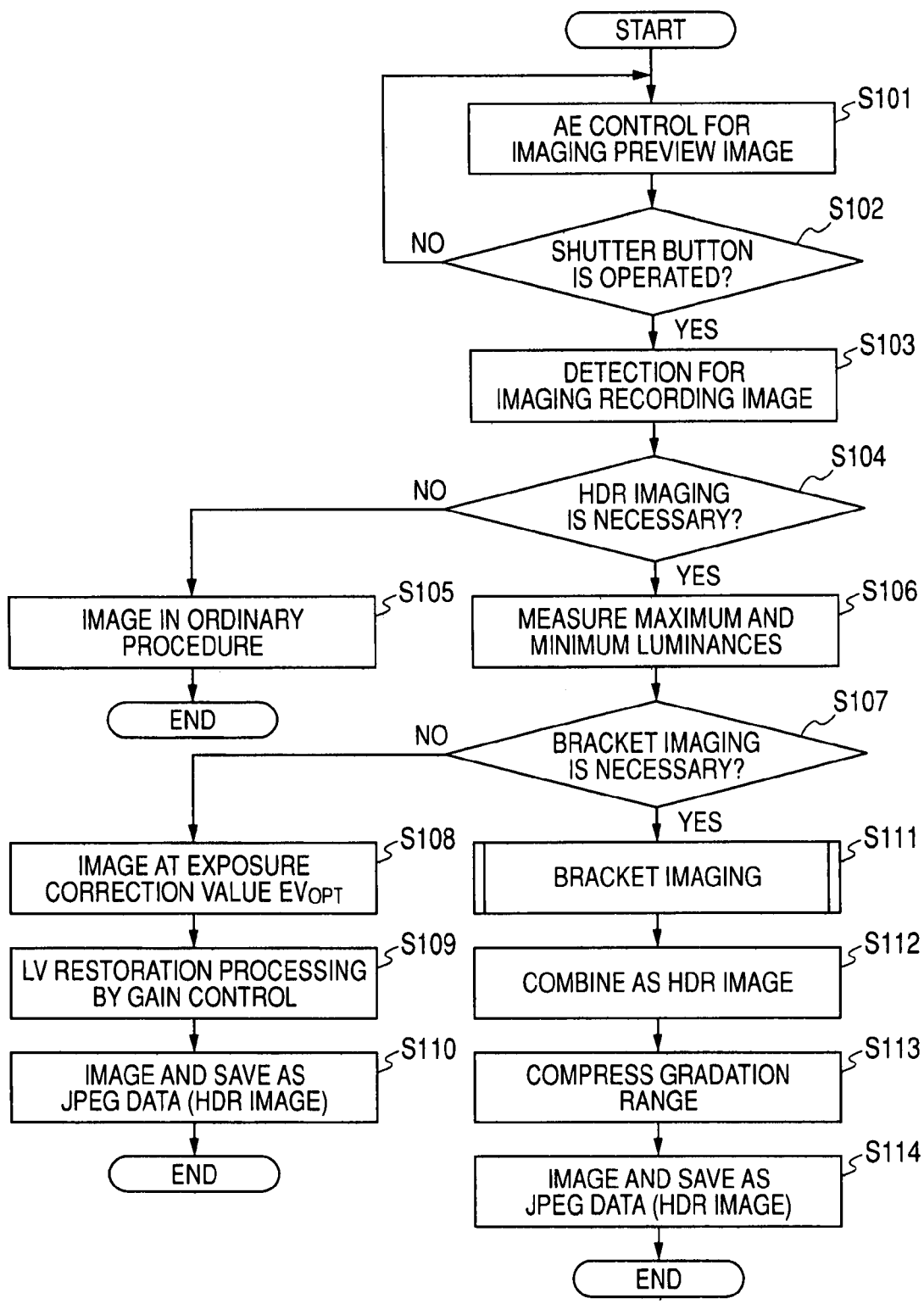
FIG. 2 is a flowchart showing a procedure of an entire imaging operation in the DSC according to the first embodiment.

FIG. 2 is a flowchart showing a procedure of an entire imaging operation in the DSC according to the first embodiment.

[Step S101] When a power supply is turned on, the DSC comes into a state in which the DSC stands by for a recording request for an imaged image from the user, i.e., a state in which a preview image is displayed on the monitor of the display unit 19. In this state, image data outputted from the ISO gain control unit 14 is inputted to the detecting unit 22 without being subjected to filter processing by the LPF 21. The microcomputer 20 performs AF control by controlling electronic shutter speed of the imaging element 12 and an opening of the aperture 11a on the basis of a detection value of luminance information in the detecting unit 22. In this case, for example, the detecting unit 22 divides an angle of view of an imaged image into a predetermined number of photometry areas to detect a luminance. The microcomputer 20 estimates a proper exposure control value by judging a pattern from a luminance average value of luminances in the respective photometry areas.

[Step S102] The AE control for imaging a preview image described above is executed until the user operates a shutter button. When the shutter button is depressed, AE processing for recording an image is executed. In an actual operation, for example, when the shutter button is depressed half in step S102, processing in step S103 and the subsequent steps is executed. After that, when the state of the shutter button is not released and the shutter button is fully depressed, processing in step S105, steps S108 to S110, or steps S111 to S114 is executed.

[Step S103] When the half-press operation of the shutter button is detected, first, detection processing for imaging a recording image is executed. In this processing, filter processing is applied to image signal outputted from the ISO gain control unit 14 by the LPF 21. The image data after the filter processing is supplied to the detecting unit 22. A luminance is detected by the detecting unit 22 and notified to the microcomputer 20.

A detected value of the luminance in step S103 is used for judgment on whether the HDR imaging or the bracket imaging is necessary, measurement of a luminance range of a scene for the judgment, and calculation of an exposure correction value. By detecting a luminance from an image subjected to the filter processing by the LPF 21, even if an extremely bright small area or an extremely dark area is included in an input image, it is possible to reduce an error in the judgment and the calculation due to the small areas and stabilize a result of the judgment and a result of the calculation.

An image approximately subjected to low-pass filter processing may be acquired by a method of using an imaged image in a defocus state of the lens explained in a third embodiment below instead of using the LPF 21. Consequently, the LPF 21 can be removed and a circuit size can be controlled.

When, in step S103, a luminance is detected from a photometry area same as that during the AT control in step S101, in the following steps, the proper exposure control value estimated in step S101 is directly used as a present exposure condition. However, in the following steps, an exposure control value obtained by controlling an exposure time using not only the electronic shutter function by the imaging element 12 but also the shutter 11b is used as a present exposure condition.

A luminance may be detected from a photometry area different from that in the AE control in step S101 to calculate a proper exposure control value again. For example, a luminance is detected from only a predetermined area in the center of an angle of view (e.g., an area of 3% with respect to an entire area of the angle of view) or from only the center portion of the angle of view in the divided photometry areas and an area around the center portion and a proper exposure control value is estimated on the basis of a value of the detection and used as a present exposure condition. Such a setting of the photometry area can be arbitrarily changed by user operation.

[Step S104] The microcomputer 20 judges whether it is necessary to perform imaging of an HDR image. The microcomputer 20 judges, on the basis of the luminance detected in step S103, whether a ratio of pixels in which white void occurs in an image (a white void pixel ratio) and a ratio of pixels in which black solid occurs in the image (a black solid pixel ratio) are high. When the ratios are higher than thresholds set for the ratios, respectively, the microcomputer 20 judges that HDR imaging that takes into account a luminance range of a scene is necessary. Specifically, on the basis of the luminance, a ratio of pixels having an amount of charge equal to or larger than a saturated amount of charge Qs of the imaging element 12 is calculated as a white void pixel ratio. A ratio of pixels having a noise level equal to or lower than a noise level Nf of the imaging element 12 is calculated as a black solid pixel ratio. These ratios can be calculated from, for example, a histogram indicating a frequency for each of luminances.

[Step S105] When both the white void pixel ratio and the black solid pixel ratio are equal to or lower than the thresholds set for the ratios, respectively, it is considered that a luminance range of a scene fits in a dynamic range of an output of the imaging element 12 in a state in which imaging is performed under the present exposure condition (i.e., the exposure condition estimated by the AE control in step S101). Therefore, the microcomputer 2 causes the DSC to execute an imaging operation in a normal procedure in the past on the basis of the present exposure condition. In other words, image data exposed on the basis of the present exposure condition and captured is recorded in the recording unit 18 as JPEG data or RAW image data with the detection of full pressing of the shutter button as a trigger.

[Step S106] On the other hand, when one of the white void pixel ratio and the black solid pixel ratio exceeds the threshold set for the ratio, it is considered that a luminance range of a scene does not fit in the dynamic range of the output of the imaging element 12 under the present exposure condition. Thus, it is judged that the HDR imaging is necessary. In this case, subsequently, measurement of a luminance range of a scene, i.e., a maximum luminance $Y_H$ and a minimum luminance $Y_L$ is performed.

In the measurement of the maximum luminance $Y_H$, the microcomputer 20 causes the DSC to execute imaging while gradually decreasing an exposure correction value and changing an exposure condition every time the exposure correction value is decreased until the exposure correction value reaches a limit value on a minus side of the exposure correction value set in advance or white void pixels are eliminated. The microcomputer 20 measures an exposure correction value $EV_H$ with which a luminance on a high luminance side of the scene fits in the dynamic range of the output of the imaging element 12. The microcomputer 20 calculates the maximum luminance $Y_H$ according to the following Equation (1) on the basis of the measured exposure correction value $EV_H$ and a maximum luminance $Y_{DH}$ in a dynamic range of an imaging signal at the time of imaging under a predetermined reference exposure condition.

Similarly, in the measurement of the minimum luminance $Y_L$, the microcomputer 20 causes the DSC to execute imaging while gradually increasing an exposure correction value until the exposure correction value reaches a limit value on a plus side of the exposure correction value set in advance or black solid pixels are eliminated. The microcomputer 20 measures an exposure correction value $E_{VL}$ with which a luminance on a low luminance side of the scene fits in the dynamic range of the output of the imaging element 12. The microcomputer 20 calculates the minimum luminance $Y_H$ according to the following Equation (2) on the basis of the measured exposure correction value $E_{VL}$ and a minimum luminance $Y_{DL}$ in the dynamic range of the imaging signal at the time of imaging under the predetermined reference exposure condition. Pixels having an amount of charge equal to or smaller than an amount of charge at an average of a noise level Nf of dark noise of the imaging element 12 are judged as the black solid pixels. The noise level N changes according to an exposure time, the temperature of the imaging element 12, and the like.

$$Y_H = 2^{-EV_H} \times (Q_{MAX}/QS) \times Y_{DH} \quad (1)$$

$$Y_L = 2^{-EV_L} \times (Q_{MIN}/QS) \times Y_{DL} \quad (2)$$

In Equations (1) and (2), Qs indicates a saturated amount of charge of the imaging element 12. $Q_{MAX}$ and $Q_{MIN}$ indicate a maximum value and a minimum value of an amount of charge, respectively, and can be converted from detection values of luminances (a white level and a black level) defined as white and black, respectively. The luminances $Y_{DH}$ and $Y_{DL}$ indicate maximum and minimum luminances in the dynamic range of the output of the imaging element 12 under the reference exposure condition determined in advance, respectively.

In the calculation of the maximum luminance $Y_H$ and the minimum luminance $Y_L$, in particular, when pixels having an extremely high luminance are present in an angle of view, a calculation result may be unstable. On the other hand, as described above, such a problem can be solved by performing the detection of a luminance after applying, with the LPF 21, the filter processing to image value obtained by imaging.

[Step S107] Subsequently, the microcomputer 20 judges whether the bracket imaging is necessary on the basis of calculation results of the maximum luminance $Y_H$ and the minimum luminance $Y_L$. Specifically, the microcomputer 20 judges whether the bracket imaging is necessary on the basis of a result of comparison of a value of $Y_H/Y_L$ and a converted value $D_{SENSOR}$ of the dynamic range of the output of the imaging element 12.

[Step S108] When the value of $Y_H/Y_L$ is equal to or smaller than the converted value $D_{SENSOR}$ of the dynamic range, since it can be judged that the dynamic range of the output of the imaging element 12 is wider than a luminance range of the scene, the microcomputer 20 judges that the bracket imaging is unnecessary. In this case, the microcomputer 20 shifts the exposure control value under the exposure condition estimated in step S101 (including the control of the shutter 11b) by an exposure correction value EVopt to correct the exposure control value such that white void and black solid do not occur and causes the DSC to execute an exposure operation once using the corrected exposure control value.

[Step S109] Moreover, the microcomputer 20 sets a gain of (−Vopt)th power of 2 in the ISO gain control unit 14 and corrects the image data obtained by imaging such that the brightness LV is restored.

[Step S110] The corrected image data is supplied to the development processing unit 17 through the combination processing unit 16 and recorded in the recording unit 18 as JPEG data of the HDR image. Alternatively, the corrected image data may be recorded in the recording unit 18 as RAW image data of the HDR image without being supplied to the development processing unit 17.

[Step S111] On the other hand, when the value of $Y_H/Y_L$ exceeds the converted value $D_{SENSOR}$ of the dynamic range, since it can be judged that the dynamic range is narrower than the luminance range of the scene, the microcomputer 20 judges that the bracket imaging is necessary. In this case, the microcomputer 20 causes the DSC to execute the bracket imaging using an exposure control value based on the maximum luminance $Y_H$ and the minimum luminance $Y_L$ measured in step S106. In other words, the microcomputer 20 separately acquires images in which areas on a high luminance side and a low luminance side of the scene are imaged under proper exposure conditions, respectively.

Figure 3:
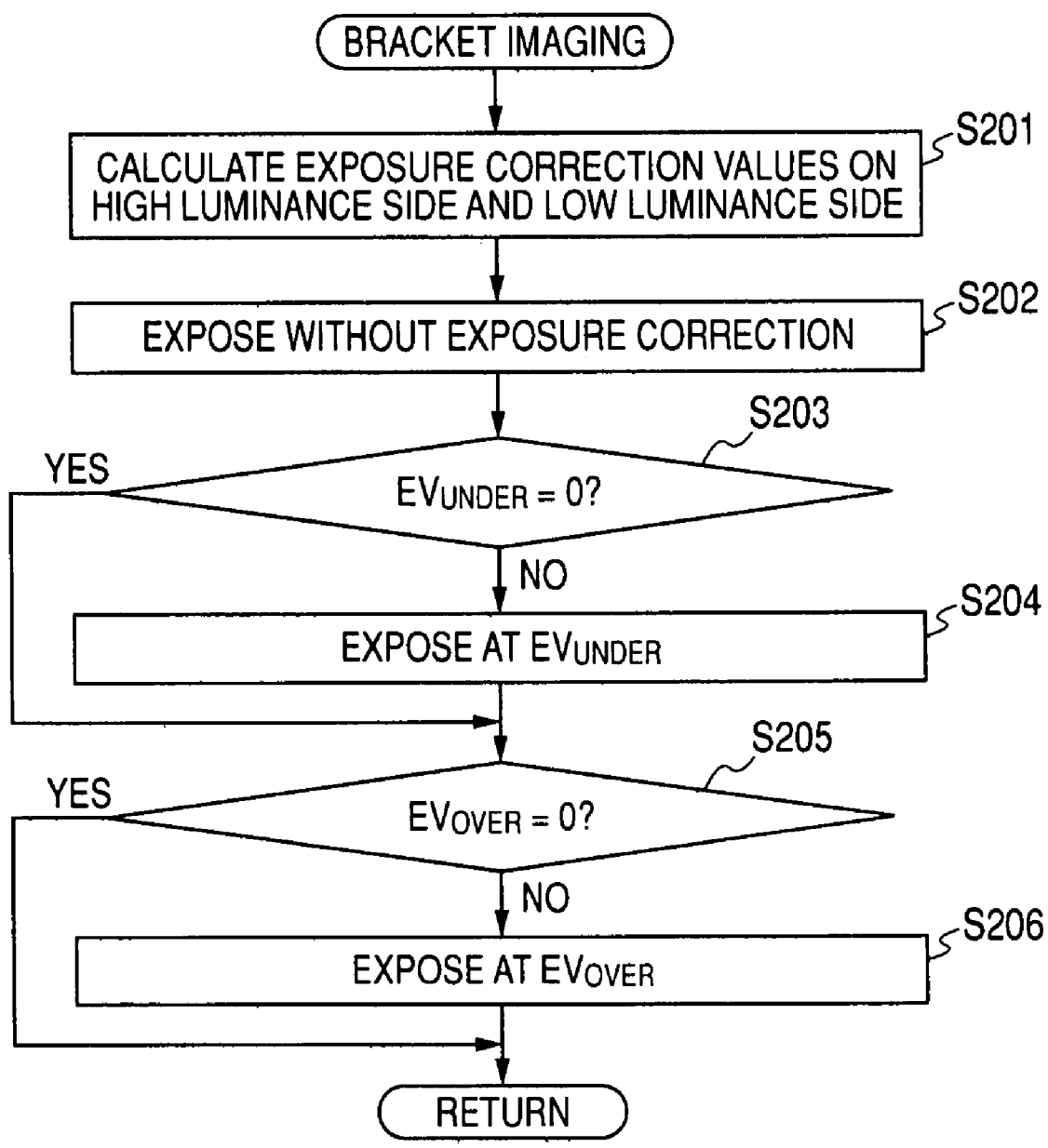
FIG. 3 is a flowchart showing a processing procedure of bracket imaging in step S111.

FIG. 3 is a flowchart showing processing procedure of the bracket imaging in step S111.

[Step S201] The microcomputer 20 calculates exposure correction values $EV_{UNDER}$ and $EV_{OVER}$ on the high luminance side and the low luminance side of the scene in accordance with the following Equations (3) and (4) using the maximum luminance $Y_H$ and the minimum luminance $Y_L$ measured in step S106. $EV_{UNDER}$ is equal to or smaller than 0 and $EV_{OVER}$ is equal to or larger than 0.

$$EV_{UNDER} = -\log_2(Y_H/Y_{DH}) \quad (3)$$

$$EV_{OVER} = -\log_2(Y_L/Y_{DL}) \quad (4)$$

[Step S202] The microcomputer 20 causes the DSC to execute an exposure operation directly using the exposure control value estimated in step S101 (or estimated in step S103 again) without change and images a reference image P0. Image data obtained by the imaging is temporarily stored in the buffer memory 15.

[Step S203] The microcomputer 20 judges whether the exposure correction value $EV_{UNDER}$ is 0. When the exposure correction value $EV_{UNDER}$ is 0, processing in step S205 is executed. When the exposure correction value $EV_{UNDER}$ is not 0, processing in step S204 is executed.

[Step S204] When the exposure correction value $EV_{UNDER}$ is not 0, the microcomputer 20 causes the DSC to execute an exposure operation by applying the exposure correction value $EV_{UNDER}$ thereto. Consequently, an image $P_{UNDER}$ formed when the exposure is corrected to the under side by a necessary minimum amount to prevent white void from occurring in a subject having a high luminance is obtained and image data of the image is temporarily stored in the buffer memory 15.

[Step S205] The microcomputer 20 judges whether the exposure correction value $EV_{OVER}$ is 0. When the exposure correction value $EV_{OVER}$ is 0, processing in step S112 is executed. When exposure correction value $EV_{OVER}$ is not 0, processing in step S206 is executed.

[Step S206] When the exposure correction value $EV_{OVER}$ is not 0, the microcomputer 20 causes the DSC to execute an exposure operation by applying the exposure correction value $EV_{OVER}$ to imaging. Consequently, an image $P_{OVER}$ formed when the exposure is corrected to the over side by a necessary minimum amount to prevent black solid from occurring in a subject having a low luminance is obtained. Image data of the image is temporarily stored in the buffer memory 15.

In the processing procedure in FIG. 3, when one of the exposure correction values $EV_{UNDER}$ and $EV_{OVER}$ is 0, imaging is not performed using the exposure correction value. Thus, the exposure in the necessary minimum number of times is executed. A shutter lag is minimized by imaging the reference image $P_0$ first. Concerning imaging of second and the subsequent images, a shutter lag can be prevented by performing imaging in an order from imaging with a shortest exposure time (i.e., imaging in under correction is performed first). Since a time difference among three imaging operations is reduced, even when the subject moves a little, substantially the same images can be imaged. Deterioration in an image quality of a combined image generated in step S112 can be reduced.

FIG. 2 is referred to again.

[Step S112] Subsequently, the respective image data stored in the buffer memory 15 are read out by the combination processing unit 16 and combined as one HDR image. The combination processing unit 16 receives the exposure correction values $EV_{UNDER}$ and $EV_{OVER}$ on the high luminance side and the low luminance side from the microcomputer 20. The microcomputer 20 determines an amount of charge P(x,y) of pixels in a spatial position (x,y) in the image P after the combination using the exposure correction values in accordance with the following Equation (5) and generates on HDR image. In Equation (5), $P_0(x,y)$, $P_{UNDER}(x,y)$, and $P_{OVER}(x,y)$ indicate the amount of charge of pixels in spatial positions (x,y) in the reference image $P_0$, the image $P_{UNDER}$, and the image $P_{OVER}$, respectively.

$$P(x, y) = \begin{cases} 2^{-EV_{OVER}} \times P_{OVER}(x, y): & \text{(in the case of } P_{OVER}(x, y) \leq Qs) \\ P_0(x, y): & \text{(in the case of } P_0(x, y) \leq Qs) \\ 2^{-EV_{UNDER}} \times P_{UNDER}(x, y): & \text{(the other cases)} \end{cases} \quad (5)$$

In Equation (5), data of pixels having an unsaturated amount of charge in the reference image $P_0$ are combined in the image P. However, concerning pixels having an unsaturated amount of charge in the image $P_{OVER}$ having the exposure corrected to the over side, pixel data of the image $P_{OVER}$ rather than the reference image $P_0$ are combined in the image P. Consequently, it is possible to leave gradation in an area in which black solid occurs in the reference image $P_0$. Concerning pixels other than those under the condition described above, i.e., pixels in which an amount of charge is saturated in the reference image $P_0$, pixel data of the image $P_{UNDER}$ formed when the exposure is corrected to the under side is combined in the image P. Consequently, gradation can be left in an area where white void occurs in the reference image $P_0$. Therefore, the image P after the combination is an HDR image in which gradation in a luminance range wider than that of the reference image $P_0$ is represented.

In applying the pixel data of the images $P_{UNDER}$ and $P_{OVER}$, the pixel data are multiplied with coefficients corresponding to the exposure correction values $EV_{UNDER}$ and $EV_{OVER}$. An action by such calculation is explained with reference to FIG. 4 below.

Figure 4:
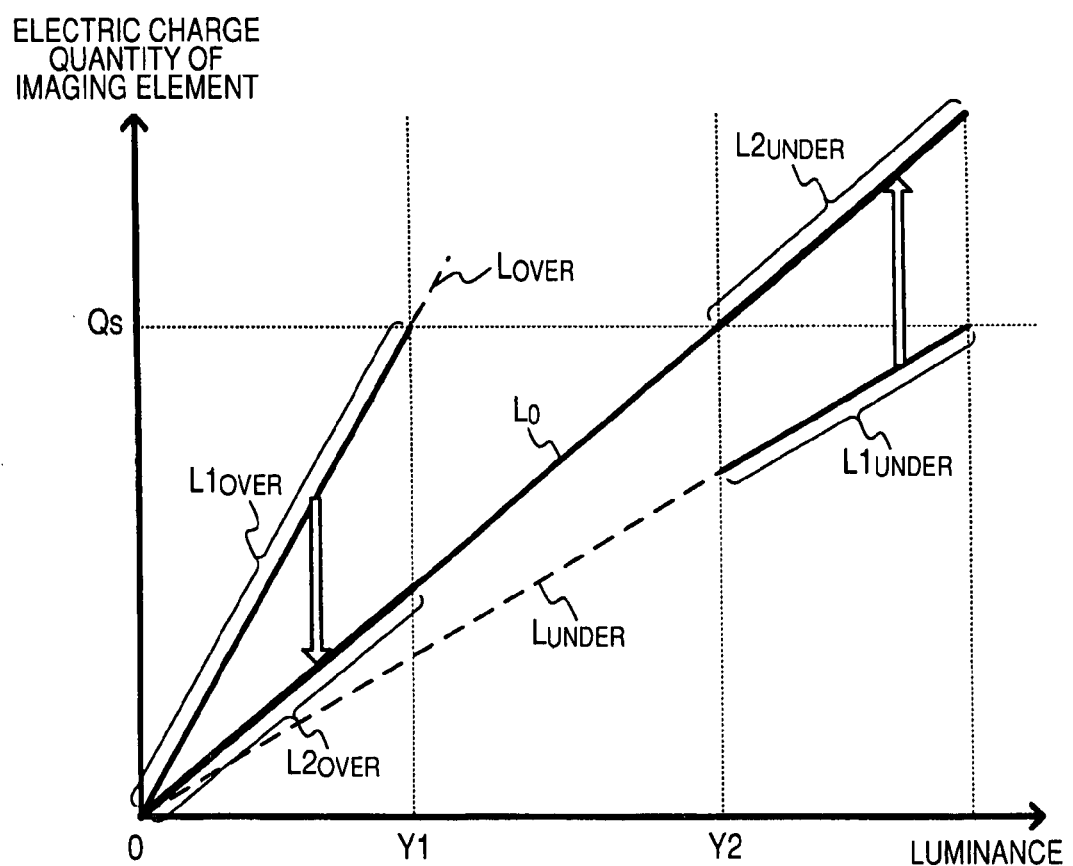
FIG. 4 is a diagram for explaining a relation of brightness between images to be combined.

FIG. 4 is a diagram for explaining a relation of brightness between images to be combined.

In FIG. 4, straight line $L_0$ indicates a relation between a luminance of a scene and an amount of charge of the imaging element 12 under an exposure condition applied to the reference image $P_0$. Straight line LOVER indicates a relation between a luminance of a scene and an amount of charge of the imaging element 12 under an exposure condition applied to the image $P_{OVER}$ formed when the exposure is corrected to the over side. Straight line $L_{UNDER}$ indicates a relation between a luminance of a scene and an amount of charge of the imaging element 12 under an exposure condition applied to the image $P_{UNDER}$ formed when the exposure is corrected to the under side.

Under a condition $P_{OVER}(x,y) \leqq Qs$, data of pixels having luminances equal to or smaller than Y1 in the reference image $P_0$ is replaced with data of pixels of the image $P_{OVER}$. Consequently, gradation information in a luminance range lower than the dynamic range of the output of the imaging element 12 can be incorporated in the image data after combination. In this case, by applying a coefficient ($-EV_{OVER}$th power of 2) corresponding to the exposure correction value $EV_{OVER}$, straight line $L1_{OVER}$ that is a component corresponding to a luminance equal to or smaller than Y1 of the straight line $L_{OVER}$ is converted into straight line $L2_{OVER}$ that has a tilt same as that of the straight line $L_0$ and is connected to the straight line $L_0$.

Under a condition $P0(x,y) > Qs$, data of pixels having luminances equal to or larger than Y2 in the reference image $P_0$ are replaced with data of pixels of the image $P_{UNDER}$. Consequently, gradation information in a luminance range higher than the dynamic range of the output of the imaging element 12 can be incorporated in the image data after combination. In this case, by applying a coefficient ($-EV_{UNDER}$th power of 2) corresponding to the exposure correction value $EV_{UNDER}$, straight line $L1_{UNDER}$ that is a component corresponding to a luminance equal to or larger than Y2 of the straight line $L_{UNDER}$ is converted into straight line $L2_{UNDER}$ that has a tilt same as that of the straight line $L_0$ and is connected to the straight line $L_0$.

Therefore, in combining images, data of pixels can be corrected such that a change in brightness is continuous across a boundary portion where pixels of images having different exposure control values are adjacent to each other. A natural combined image (HDR image) without incongruity can be generated.

FIG. 2 is referred to again.

[Step S113] The HDR image combined by the processing in step S112 has the number of bits larger than that of image data that can be subjected to development processing (the data interpolation processing, the various color adjustment/conversion processing, and the compression and encoding processing) by the development processing unit 17. For example, whereas RAW image data that can be processed by the development processing unit 17 has 12 bits, the HDR image data obtained by the combination processing unit 16 is 15-bit data, a gradation range of which is expanded. Therefore, the development processing unit 17 can process the HDR image data obtained by the combination processing unit 16 without changing the structure of the development processing unit 17 at a post-stage of the processing by applying bit compression to HDR image data and converting the HDR image data into 12-bit RAW image data at a pre-stage of the processing. In this case, as explained below, the development processing unit 17 applies compression processing for a gradation range, with which a quality of the HDR image from the combination processing unit 16 can be satisfactorily kept, to the HDR image and, then, performs bit compression for the HDR image.

Figure 5:
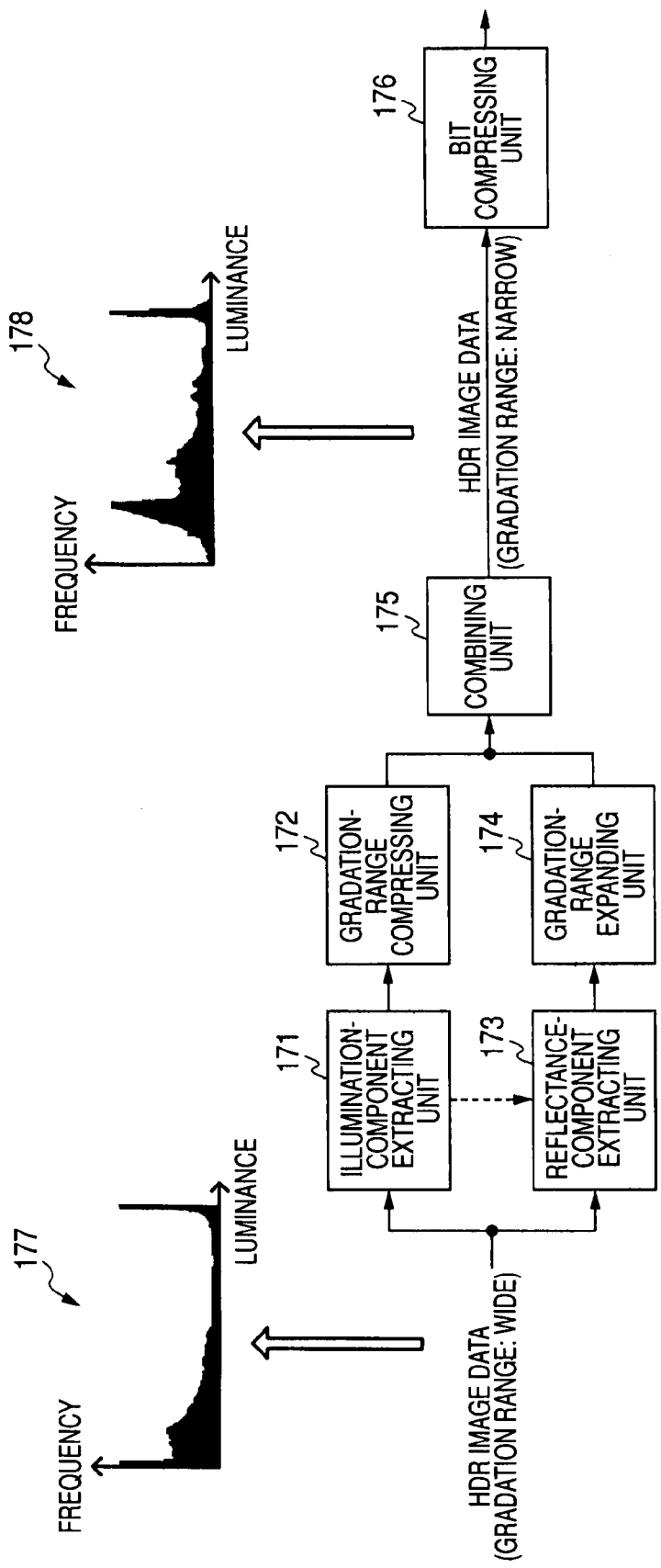
FIG. 5 is a block diagram showing functions for gradation range compression of at HDR image.

FIG. 5 is a block diagram showing functions for the gradation range compression for the HDR image.

For the gradation range compression of the HDR image, as shown in FIG. 5, the development processing unit 17 includes an illumination-component extracting unit 171, a gradation-range compressing unit 172, a reflectance-component extracting unit 173, a gradation-range expanding unit 174, a combining unit 175, and a bit compressing unit 176.

The illumination-component extracting unit 171 extracts illumination components by applying low-pass filter processing to inputted HDR image data. For the extraction of illumination components, it is desirable to use a nonlinear low-pass filter that performs high-frequency cut processing to leave edge components. As similar low-pass filter processing, a probabilistic method can also be used other than the nonlinear low-pass filter.

Figure 6A:
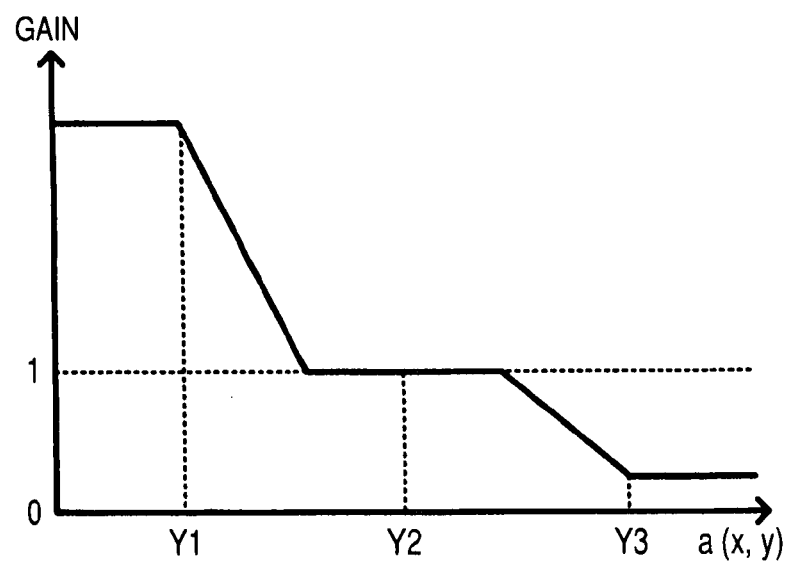
FIGS. 6A and 6B are diagrams showing examples of gain curves set during the gradation range compression of the HDR image.

The gradation-range compressing unit 172 converts luminances of respective pixels of image data including only inputted illumination components in accordance with, for example, a lookup table (LUT) indicating correspondence of input and output levels and compresses a gradation range. Specifically, as shown in FIG. 6A, the gradation-range compressing unit 172 sets a gain larger than 1 for an area on a low luminance side of illumination components to amplify the gradation level and sets a gain smaller than 1 for an area on a high luminance side to reduce the gradation level.

The reflectance-component extracting unit 173 extracts reflectance components from an inputted HDR image. For example, the reflectance-component extracting unit 173 calculates reflectance components by subtracting data of the illumination components extracted by the illumination-component extracting unit 171 from data of the inputted HDR image. Alternatively, the reflectance-component extracting unit 173 may divide the data of the inputted HDR image by the data of the illumination components. The gradation-range expanding unit 174 converts luminances of the extracted reflectance components for each of the pixels in accordance with, for example, the LUT indicating correspondence of input and output levels and expands the gradation range.

The combining unit 175 combines image data outputted from the gradation-range compressing unit 172 and the gradation-range expanding unit 174, respectively, for each of the pixels and outputs an HDR image having a gradation range compressed as a whole. For example, when the reflectance-component extracting unit 173 calculates the data of the reflectance components by subtracting the data of the illumination component from the inputted image data, the combining unit 175 performs combination processing by adding up the respective image data outputted from the gradation-range compressing unit 172 and the gradation-range expanding unit 174. When the reflectance-component extracting unit 173 calculates the data of the reflectance components by dividing the inputted image data by the data of the illumination components, the combining unit 175 performs combination processing by multiplying the respectively image data outputted from the gradation-range compressing unit 172 and the gradation-range expanding unit 174 together.

The bit compressing unit 176 compresses the number of bits of the data of the HDR image generated by the combining unit 175. For example, when the data of the HDR image outputted from the combining unit 175 is 15-bit data, the bit compressing unit 176 converts RAW image data of the HDR image into 12-bit data that can be processed by the development processing unit 17.

Figure 6B:
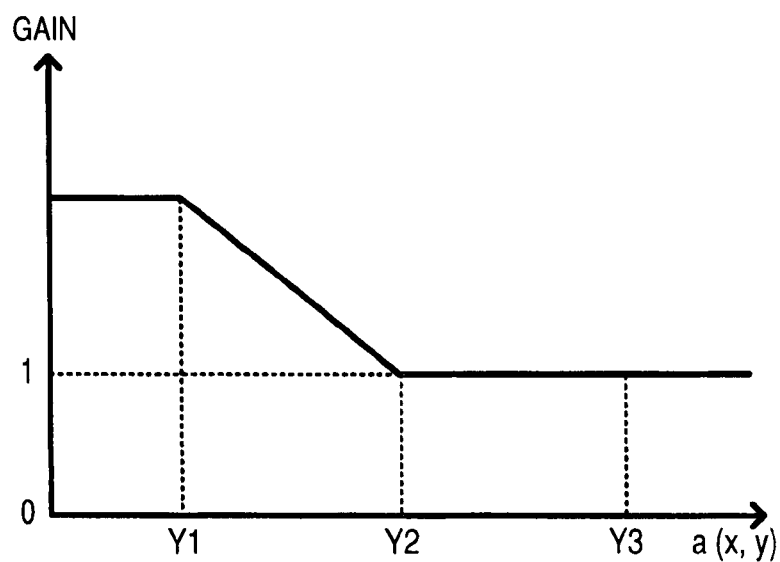

FIGS. 6A and 6B are diagrams showing examples of gain curves set during gradation range compression of the HDR image.

In FIGS. 6A and 6B, a(x,y) indicates a luminance for each of the pixels of the illumination components subjected to the low-pass filter processing and extracted by the illumination-component extracting unit 171. As shown in FIG. 6A, the gradation-range compressing unit 172 amplifies an input level with respect to data of the respective pixels of the illumination components as a luminance is lower and compresses an input level as the luminance is higher. Consequently, a gradation range is compressed as a whole.

On the other hand, in the gradation-range expanding unit 174, most basically, a gain same as that in the gradation-range compressing unit 172 only has to be given to the reflectance components according to a luminance of the illumination components. Consequently, since a level (amplitude) of the reflectance components is amplified in an area in which the illumination components are dark, the reflectance components in this area are enhanced relatively to those before the application of the gain. As a result, the gradation range is expanded. Since the reflectance components are components that substantially contribute to reproducibility of details, when the gain is given, detail components buried in the dark portion are enhanced. Therefor, it is possible to compress the overall gradation range without losing the detail components as much as possible. When image data after such gradation range compression is compressed by the bit compressing unit 176, a quality of the image data can be improved.

In the structure in FIG. 5, the gradation-range compressing unit 172 and the gradation-range expanding unit 174 corresponding to the illumination components and the reflectance components, respectively, are separately provided. This makes it possible to apply separate gain curves to the illumination components and the reflectance components, respectively. Consequently, it is also possible to improve reproducibility of details in an arbitrary area of brightness distribution of the illumination components.

As a preferred example in this case, for the reflectance components, the detail components in the low luminance area can be further enhanced by applying a gain higher than the illumination components to pixels corresponding to the low luminance area of the illumination components. In the example shown in FIGS. 6A and 6B, first, a gain curve common to the illumination components shown in FIG. 6A is applied to the reflectance components and, then, a gain curve shown in FIG. 6B is further applied to reflectance components. By applying such gain curves, it is possible to improve reproducibility of details while setting a gradation range compression amount of the illumination components to a necessary minimum amount and maintaining a sense of contrast of the entire image.

In the gain curves shown in FIGS. 6A and 6B, luminances Y1 to Y3 may be prepared in advance as fixed values. However, the luminances may be calculated from a signal analysis result of an input image. For example, with the luminances Y1, Y2, and Y3 set as luminances Yl, Ym, and Yh explained with reference to FIG. 13 later, these values may be calculated on the basis of an analysis result of the illumination components.

In FIG. 5, examples of a histogram 177 indicating a frequency for each luminance in the HDR image before compression of the gradation range and a similar histogram 178 in the HDR image after compression are shown. According to the histograms 177 and 178, it is seen that, in the HDR image data after gradation range compression, a range of luminance in which data is present (i.e., a gradation range) is narrow, pixels having illumination components from the middle to a low frequency side area increase, and a gradation property in this luminance area is abundant.

In the explanation referring to FIG. 5, the low-pass filter is used for extraction of the illumination components. However, the illumination component of the image may be extracted by a method of using an imaged image in a defocus state of a lens explained in a third embodiment later. Consequently, a low-pass filter circuit for extracting illumination components can be removed and a circuit size can be controlled. When this method is used, for example, the lens is brought into the defocus state after the bracket imaging to acquire an image at that time (a defocus image). It is also possible that, in a preview state corresponding to step S101, images in the defocus state are periodically acquired, a latest defocus image is typically stored in the buffer memory 15 or the like, and the defocus image is used during gradation range compression processing after the shutter button is fully pressed. Alternatively, when the image subjected to the low-pass filter processing in step S103 is acquired as a defocus image, image data of the image may be held and used as illumination components. Whichever of the image data acquired in the preview state and the image data acquired in step S103 is used, a shutter lag can be reduced.

FIG. 2 is referred to again.

[Step S114] The HDR image data after the gradation range compression is developed by the development processing unit 17 and stored on the recording unit 18 as JPEG data of the HDR image. As described above, the function of the development processing (data interpolation, color adjustment/conversion, compression and encoding processing) of the development processing unit 17 applied to this embodiment is adapted to process data of one image obtained by imaging in one exposure. This image data is, for example, 12-bit data and is equivalent to the image data obtained in steps S105 and S108, respectively, and the image data of the respective images obtained during the bracket imaging in step S111.

On the other hand, the data of the HDR image generated by the processing in step S112 has the number of bits larger than that of the image data that can be subjected to development processing by the development processing unit 17. The data of the HDR image is, for example, 15-bit data. However, it is possible to apply the development processing to the data without changing a circuit configuration of the development processing unit 17 by compressing a gradation range while keeping a satisfactory image quality with the processing in step S113 and converting the data into image data of 12 bits.

The data of the HDR image after the combination by the combining unit 175 in FIG. 5 is converted into data having the smaller number of bits by the bit compressing unit 176 and, then, subjected to the development processing. However, when there is a margin in the number of bits that can be processed by the development processing unit 17, the data may be subjected to the development processing without being subjected to bit compression and, in the process of the processing, converted into image data having the number of bits (here, 8 bits) adaptable to the display device and the like.

In this processing example, the HDR image is recorded as the JPEG data during imaging. Besides, it is also possible that, during imaging, the data of the HDR image from the combination processing unit 16 is recorded in the recording unit 18 as RAW image data without being processed by the development processing unit 17 and, then, the RAW image data is read out and subjected to the gradation range compression and the development processing by the development processing unit 17.

In the processing example described above, when there is a change in an angle of view or a motion of a subject, it is likely that an appropriate image cannot be generated by the combination processing in step S112. Thus, in storing the data of the HDR image generated in step S112 on the recording unit 18 as RAW image data, data of the reference image $P_0$ may be stored as RAW image data having a normal dynamic range in addition to the data of the HDR image. In storing the HDR image after combination as JPEG data during imaging, the data of the reference image $P_0$ may be stored as JPEG data in the same manner.

In the first embodiment explained above, an exposure correction value is gradually changed to perform exposure, presence or absence of white void pixels or black solid pixels is judged from an obtained image every time the exposure correction value is changed, a maximum luminance and a minimum luminance of a scene are measured, and an exposure correction value during bracket imaging is determined from a result of the measurement. Thus, even in a scene in which a luminance range is wide and it is difficult to determine an exposure condition, a probability that a proper exposure condition can be set increases. Since a proper exposure correction value corresponding to a state of such a scene can be automatically determined without depending on user operation, operability for the user is improved.

The judgment on whether the bracket imaging is necessary and the judgment on the number of times of exposure necessary during the bracket imaging can be accurately performed from the result of the measurement of the maximum luminance and the minimum luminance. Thus, useless exposure is prevented and a shutter lag can be minimized. Since a time difference of imaging timing of respective images is minimized, a change in a subject among the images is minimized and deterioration in a quality of the HDR image after combination can be controlled.

In measuring a luminance range of the scene, a detection value from imaged image data after being subjected to the low-pass filter processing is used. Thus, even when an extremely bright small area or an extremely dark small area is included in an input image, it is possible to prevent a situation in which a measurement algorism is disturbed, whereby it becomes difficult to image a proper image.

According to the method of combining a HDR image in step S112, a natural HDR image without incongruity can be generated from plural images obtained by the bracket imaging. In particular, since one HDR image is generated from images obtained by performing the bracket imaging using a proper exposure correction value as described above, an HDR image having a higher quality can be generated. Moreover, according to the method of the gradation range compression in step S113, even when the number of bits of image data decreases after that, a high image quality can be maintained without spoiling detail components of the image. According to the processing explained above, a high quality HDR image converted in a general-purpose format can be obtained.

Second Embodiment

In the first embodiment, in step S106 in FIG. 2, proper exposure correction values on the high luminance side and the low luminance side are measured by changing an actual exposure condition and, in step S107, according to a result of the measurement, it is judged whether the bracket imaging is necessary. On the other hand, in a second embodiment of the present invention explained below, in order to quickly perform an imaging operation and control a shutter lag, a luminance range of a scene is estimated directly using a result of the detection of a luminance in step S103 instead of these procedures. In this second embodiment, a luminance range of a scene is estimated on the basis of the luminance detected in step S103 and a cumulative histogram in which a histogram value indicating a frequency for each of luminances is accumulated.

Figure 7:
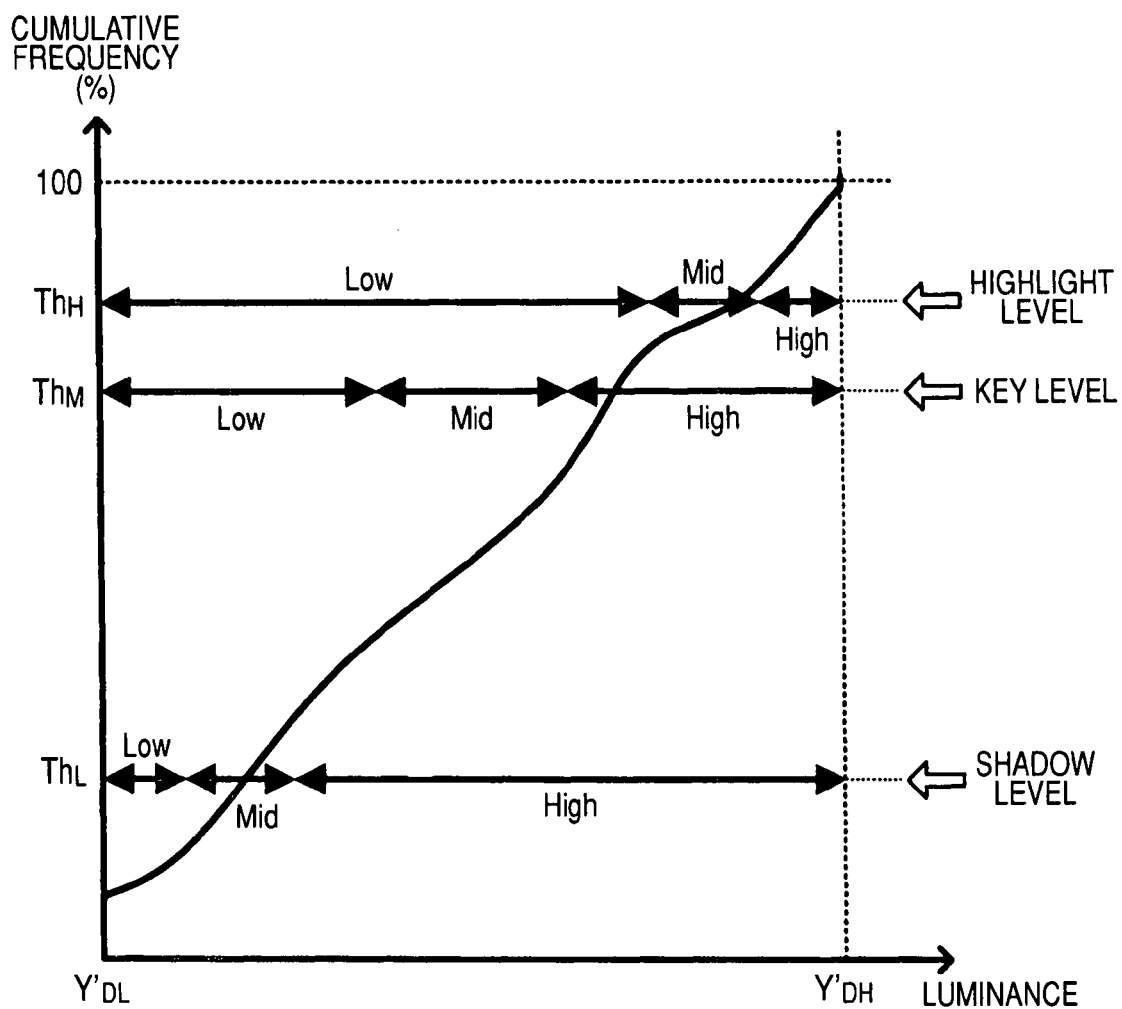
FIG. 7 is a diagram for explaining parameters calculated from a cumulative histogram.

FIG. 7 is a diagram for explaining parameters calculated from a cumulative histogram. In the cumulative histogram shown in FIG. 7, a cumulative value of histogram values corresponding to all luminances is set as a maximum value (100%) on the ordinate. In FIG. 7, $Y'_{DL}$ and $Y'_{DH}$ indicate minimum and maximum luminances that can be detected by the imaging element 12, respectively. In this embodiment, estimated states of a scene are classified using three kinds of parameters, a "key level", a "highlight level", and a "shadow level", on the basis of such a cumulative histogram and the number of stages of exposure correction is determined according to a result of the classification.

The key level indicates in which luminance area the cumulative histogram reaches a threshold $Th_H$ when a level (percentage) of a cumulative frequency at which a main subject is highly likely to be present is set as a threshold $Th_M$. In this example, luminance areas are divided into three stages, Low, Mid, and High, and the key level is represented by the areas of the three stages. It is known that such a threshold is usually at a level of the cumulative frequency equal to or higher than 50%. The threshold can be set to, for example, about 65% to 75%.

The highlight level indicates in which luminance area the cumulative histogram reaches the threshold $Th_H$ when the threshold $Th_H$ is set to a level higher than the cumulative frequency corresponding to the main subject. The shadow level indicates in which luminance area the cumulative histogram reaches a threshold $Th_L$ when the threshold $Th_L$ is set to a level lower than the cumulative frequency corresponding to the main subject. Both the highlight level and the shadow level are represented by the luminance areas divided into the three stages, Low, Mid, and High.

An example of a table for determining an exposure correction value according to a combination of the respective parameters based on the cumulative histogram is shown below. An $EV_{UNDER}$ determination table is a table for determining a proper exposure correction value $EV_{UNDER}$ on a high luminance side of a scene. An $EV_{OVER}$ determination table is a table for determining a proper exposure correction value $EV_{OVER}$ on a low luminance side of a scene. After calculating the three parameters, the microcomputer 20 determines the exposure correction values $EV_{UNDER}$ and $EV_{OVER}$ during the bracket imaging in accordance with these respective tables.

TABLE 1

$EV_{UNDER}$ Determination Table

| White void pixel | Key level | Highlight level | $EV_{UNDER}$ |
|---|---|---|---|
| No | * | * | 0 |
| Yes | High | High | −3 |
|  |  | Mid | −2 |
|  |  | Low | −1 |
|  | Mid | High | −2 |
|  |  | Mid | −1 |
|  |  | Low | −1 |

TABLE 1-continued $EV_{UNDER}$ Determination Table

| White void pixel | Key level | Highlight level | $EV_{UNDER}$ |
|---|---|---|---|
| | Low | High | −2 |
| | | Mid | −1 |
| | | Low | 0 |

TABLE 2

$EV_{OVER}$ Determination Table

| Black solid pixel | Key level | Shadow level | $EV_{OVER}$ |
|---|---|---|---|
| No | * | * | 0 |
| Yes | Low | Low | 2 |
| | | Mid | 2 |
| | | High | 1 |
| | Mid | Low | 2 |
| | | Mid | 1 |
| | | High | 0 |
| | High | Low | 1 |
| | | Mid | 0 |
| | | High | 0 |

In the respective tables, an exposure correction value is indicated by the number of correction stages with respect to an exposure control value in the reference image $P_0$. An exposure correction value equivalent to one stage of the number of correction stages is determined in advance. When the number of correction stages is 0, an exposure operation to which the number of correction stages is applied is not performed. Consequently, the number of times of exposure during the bracket imaging can be set to a necessary minimum and a shutter lag can be reduced.

Moreover, in these tables, when a white void pixel and a black solid pixel are not present during the determination of a proper number of correction stages on a high luminance side and during the determination of a proper number of correction stages on the low luminance side, it is judged that imaging of an HDR image is unnecessary, the number of correction stages is set to 0, and an exposure operation to which the number of correction stages is applied is not performed (corresponding to the judgment processing in step S104 in FIG. 2). When both proper number of correction stages on the high luminance side and the low luminance side are 0, it is judged that the bracket imaging is unnecessary (corresponding to the judgment processing in step S107 in FIG. 2).

Figure 8:
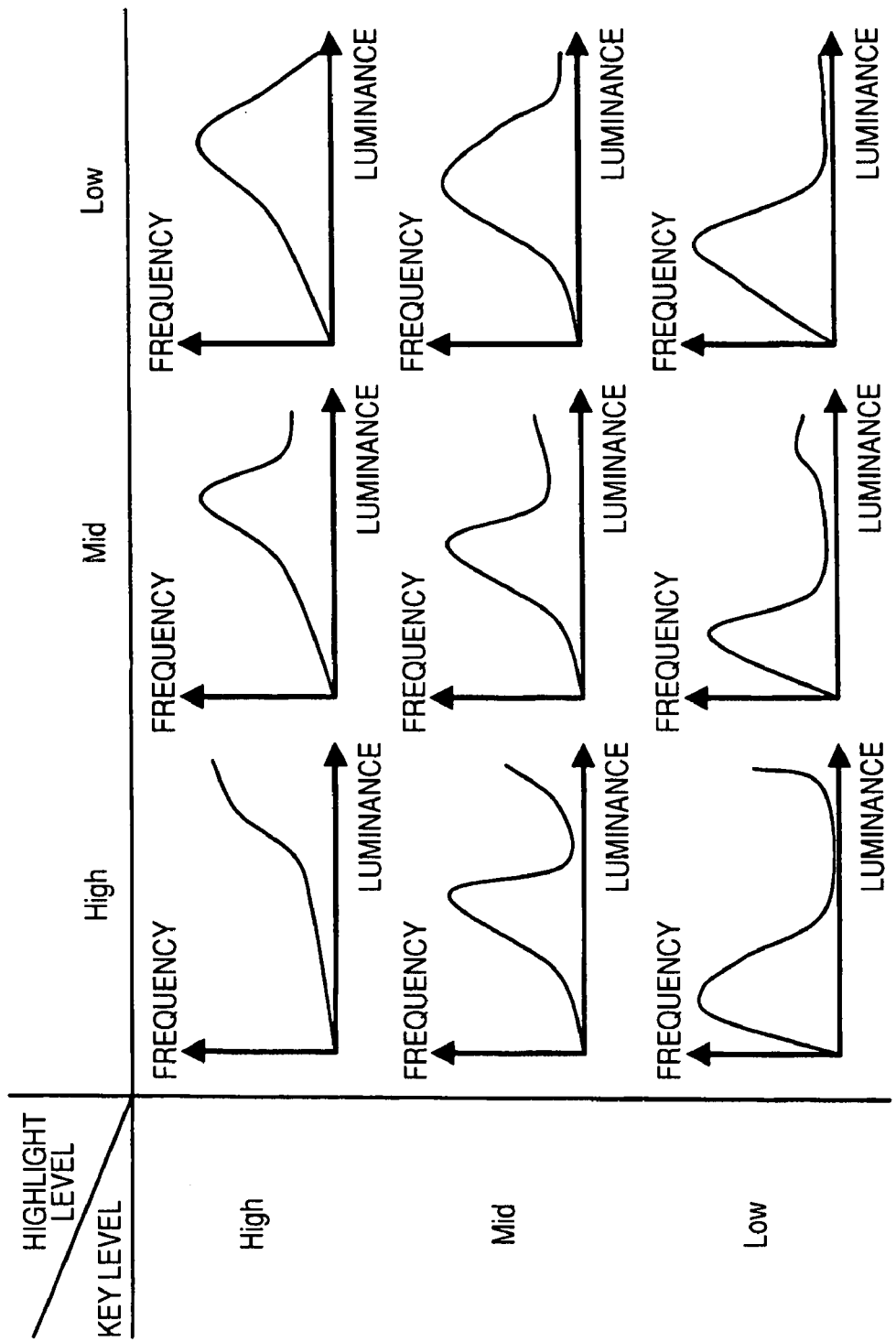
FIG. 8 is a diagram showing a representative example of a histogram that indicates frequencies of luminances corresponding to combinations of a key level and a highlight level.

FIG. 8 is a diagram showing representative examples of a histogram that indicates a frequency of a luminance corresponding to a combination of the key level and the highlight level.

As shown in FIG. 8, by classifying scenes using the threshold $Th_M$ of the key level and the threshold $Th_H$ higher than the threshold $Th_M$, a proper number of correction stages can be easily and accurately determined even when the distribution of luminances is biased. This holds true in determining a proper number of correction stages on the low luminance side.

In the second embodiment, in order to determine a proper exposure correction values during the bracket imaging, it is unnecessary to actually change an exposure correction value, perform exposure, and obtain a detection value every time the exposure correction value is changed as in the first embodiment. Thus, time necessary for the determination of the proper exposure correction value can be reduced and a shutter lag can be reduced to give comfortable operability to a user. Arithmetic processing of the microcomputer 20 can be simplified and a processing load thereon can be reduced.

In this embodiment, as an example, one parameter for classification of scenes is set on each of the high luminance side and the low luminance side other than the key level. However, it is also possible that plural parameters are set on each of the high luminance side and the low luminance side, the scenes are more finely classified, and an exposure correction value is more finely adjusted according to the classifications. Consequently, although accuracy of estimation of a proper exposure correction value can be improved, a processing load on the microcomputer 20 increases.

Third Embodiment

In a third embodiment of the present invention, an HDR image having the number of bits (here, 8 bits) same as that of image data that can be outputted to a display device or the like is directly generated by applying interpolation to image data on the basis of plural images obtained by the bracket imaging described above in the embodiments.

Figure 9:
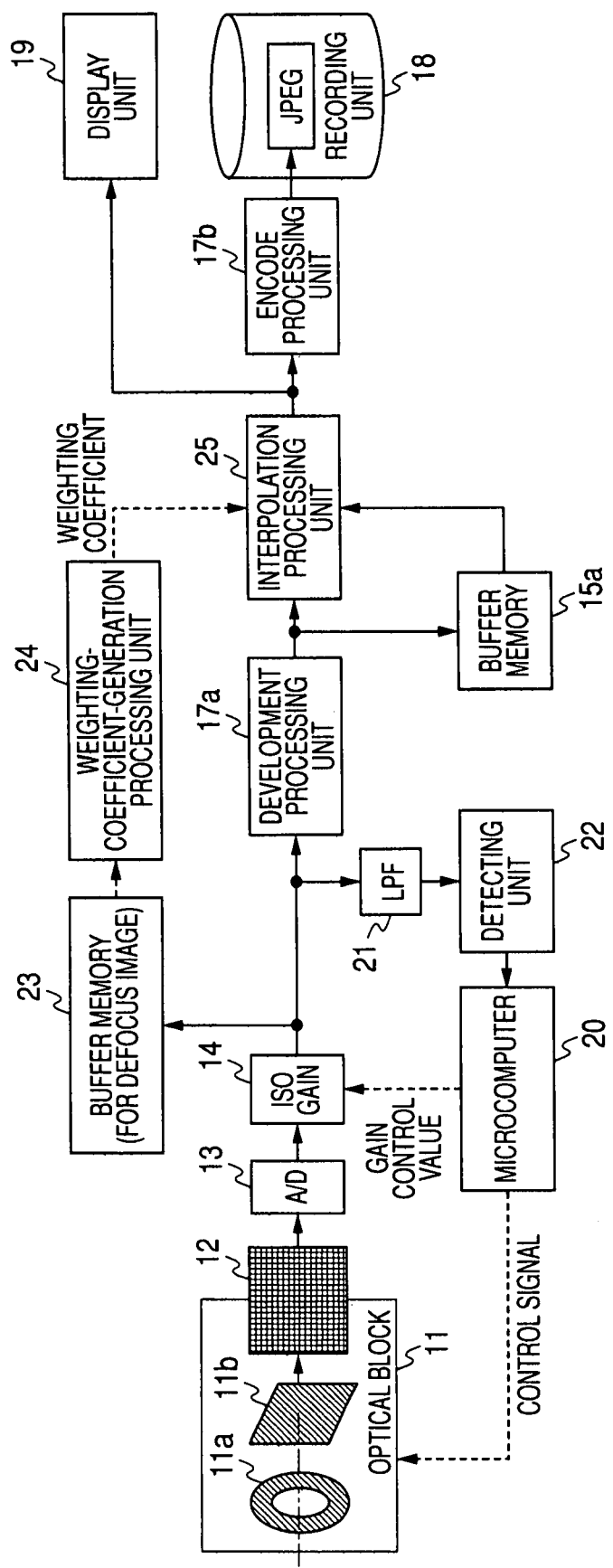
FIG. 9 is a block diagram showing an internal structure of a DSC according to a third embodiment of the present invention.

FIG. 9 is a block diagram showing an internal structure of a DSC according to the third embodiment. In FIG. 9, blocks corresponding to those in FIG. 1 are denoted by the same reference numerals and signs and explanation of the blocks is omitted.

The DSC shown in FIG. 9 includes, in addition to the components of the DSC shown in FIG. 1, a buffer memory 23 for storing data of a defocus image, a weighting-coefficient-generation processing unit 24, and an interpolation processing unit 25. In FIG. 9, a development processing unit 17a has functions excluding the image compression and encoding function among the functions of the development processing unit 17 shown in FIG. 1. The image compression and encoding function is connected to a post-stage of the interpolation processing unit 25 as an encoding processing unit 17b. A buffer memory 15a temporarily stores data of an image obtained by the bracket imaging. In storing the data, the buffer memory 15a receives the supply of image data outputted from the development processing unit 17a rather than from the ISO gain control unit 14.

The buffer memory 23 receives image data obtained by exposure in the defocus state from the ISO gain control unit 14 and temporarily stores the image data. The weighting-coefficient-generation processing unit 24 generates, on the basis of the image data stored in the buffer memory 23, a weighting coefficient used during combination of images obtained by the bracket imaging. The interpolation processing unit 25 reads out the image data obtained by the bracket imaging from the buffer memory 15a and combines the respective image data using the weighting coefficient supplied from the weighting-coefficient-generation processing unit 24. Data of an HDR image outputted at this point has the number of bits (8 bits) same as that of the image data processed by the development processing unit 17a unlike the data of the HDR image after combination in the first embodiment. The data of the HDR image can be supplied to the display unit 19 to display the HDR image or supplied to the encoding processing unit 17b to be outputted as JPEG data.

Figure 10:
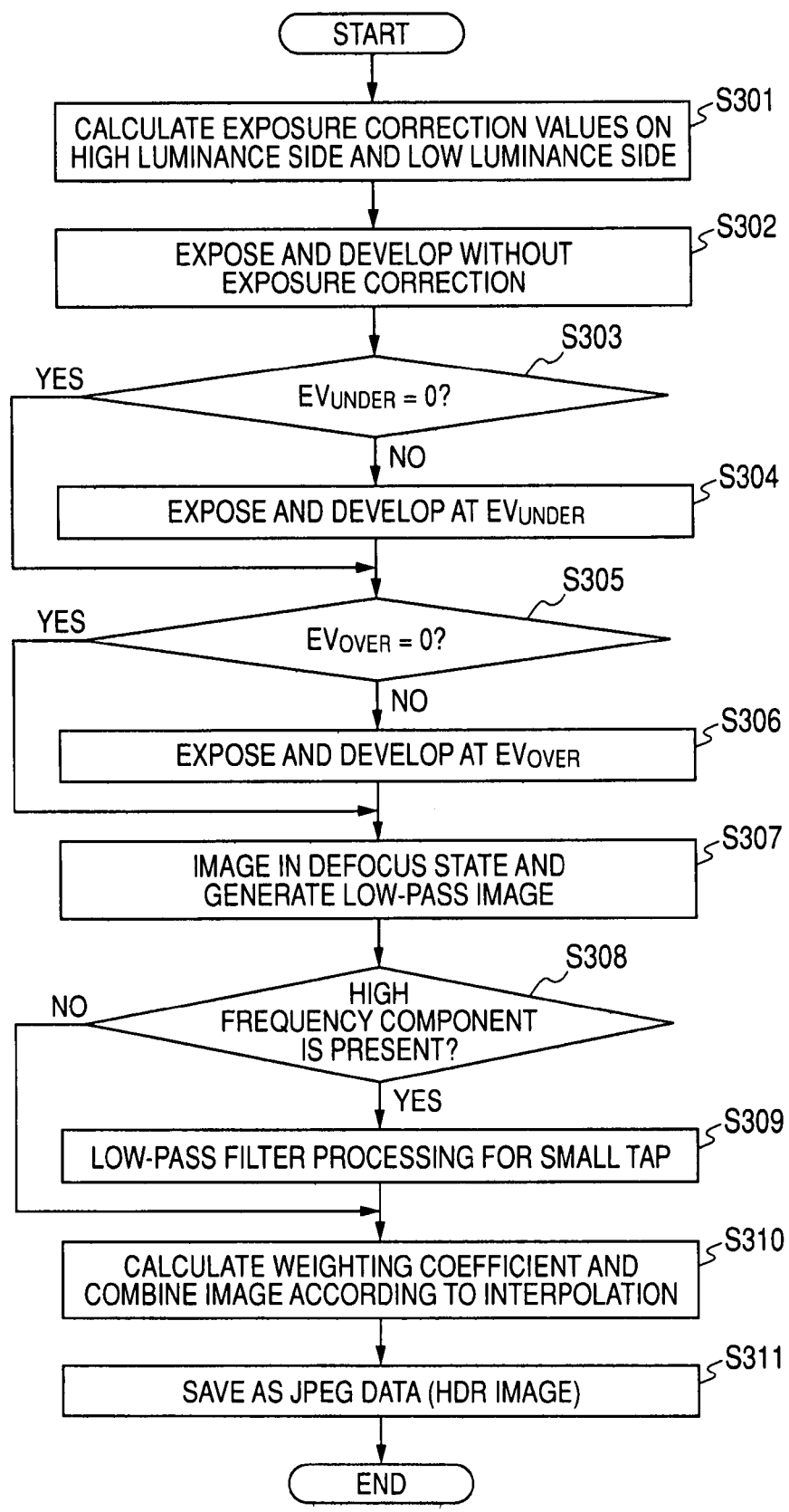
FIG. 10 is a flowchart showing a processing procedure during imaging in the DSC according to the third embodiment.

FIG. 10 is a flowchart showing a processing procedure during imaging in the DSC according to the third embodiment.

In this embodiment, processing same as that in the case of the first embodiment is performed up to the processing for judging whether imaging of an HDR image is performed (step S104 in FIG. 2) and the processing for judging whether the bracket imaging is necessary (step S107). Therefore, in FIG. 10, only processing after it is judged in step S107 that the bracket imaging is necessary is shown. In the processing for judging a luminance range of the scene (step S106) and the processing for judging the necessity of the bracket imaging (step S107), it is possible to apply the processing procedure according to the second embodiment instead of the processing procedure according to the first embodiment.

[Step S301] In this step, processing same as that in step S201 in FIG. 3 is performed. The microcomputer 20 calculates exposure correction values $EV_{UNDER}$ and $EV_{OVER}$ on a high luminance side and a low luminance side of the scene in accordance with Equations (3) and (4) above using the maximum luminance $Y_H$ and the minimum luminance $Y_L$ measured in step S106.

[Step S302] The microcomputer 20 uses the exposure control value estimated in step S101 in FIG. 2 (or estimated in step S103 again) without correcting the exposure control value, causes the DSC to execute an exposure operation, and images the reference image $P_0$. Data of the obtained reference image $P_0$ is developed by the development processing unit 17a. Data of the reference image $P'_0$ after the development is temporarily stored in the buffer memory 15a.

[Step S303] The microcomputer 20 judges whether the exposure correction value $EV_{UNDER}$ is 0. When the exposure correction value $EV_{UNDER}$ is 0, processing in step S305 is executed. When the exposure correction value $EV_{UNDER}$ is not 0, processing in step S304 is executed.

[Step S304] When exposure correction value $EV_{UNDER}$ is not 0, the microcomputer 20 applies the exposure correction value $EV_{UNDER}$ and causes the DSC to execute an exposure operation. Data of the obtained image $P_{UNDER}$ is developed by the development processing unit 17a. Data of the image $P'_{UNDER}$ after the development is temporarily stored in the buffer memory 15a.

[Step S305] The microcomputer 20 judges whether the exposure correction value $EV_{OVER}$ is 0. When the exposure correction value $EV_{OVER}$ is 0, processing in step S307 is executed. When the exposure correction value $EV_{OVER}$ is not 0, processing in step S306 is executed.

[Step S306] When the exposure correction value $EV_{OVER}$ is not 0, the microcomputer 20 applies the exposure correction value $EV_{OVER}$ and causes the DSC to execute an exposure operation. Data of the obtained image $P_{OVER}$ is developed by the development processing unit 17a. Data of the image $P'_{OVER}$ after the development is temporarily stored in the buffer memory 15a.

In the development processing in steps S302, S304, and S306, control values individually estimated from an object image by the processing by the microcomputer 20 only have to be used, respectively.

[Step S307] Subsequently, processing for generating illumination components of an imaged image necessary for obtaining a weighting coefficient applied by the interpolation processing unit 25 is executed according to the control by the microcomputer 20.

In general, the illumination components can be obtained by applying low-pass filter processing with a relatively low cut-off frequency to the imaged image. However, to obtain the illumination components, since a filter circuit having a large number of taps is necessary, an arithmetic operation amount becomes enormous. On the other hand, in this embodiment, instead of using such a filter circuit, a focus adjustment lens in the optical block 11 is controlled to be in the defocus state and an image obtained by exposure in that state (a defocus image) is used as an image subjected to the low-pass filter processing (a low-pass image). Consequently, a circuit size is reduced.

First, the microcomputer 20 performs exposure control to set the exposure condition in the center among the exposure conditions during the bracket imaging in steps S302, S304, and S306. In performing the exposure control, the microcomputer 20 determines shutter speed S and an ISO gain G to satisfy the following Equation (6).

$$S \times \sqrt{G} = (S_0 \div F_0 \times \sqrt{G_0}) \times F_{MIN} \qquad (6)$$

$F_{MIN}$ indicates an open aperture value and $S_0$, $F_0$, and $G_0$ indicate shutter speed, an aperture value, and an ISO gain under the exposure condition in the center during the bracket imaging. When Equation (6) is applied, since the aperture is opened, a depth of field is reduced and a low-pass filter effect during defocus can be intensified.

The shutter speed S and the ISO gain G determined by the method described above are applied to imaging to perform exposure and image a defocus image. In order to surely obtain a strong low-pass filter effect, two defocus images are imaged by changing a position of the focus adjustment lens, an average of the defocus images is calculated by processing in step S308, and a low-pass image is generated.

FIGS. 11A to 11D are diagrams for explaining a driving procedure for the focus adjustment lens during imaging of a defocus image.

In FIGS. 11A to 11D, an example of the structure of an optical lens group 11c in the optical block 11 and an example of a position of a focus adjustment lens 11d in the optical lens group 11c are shown. As an example, the optical lens group 11c has a macro imaging mode. In the respective figures, the right side is set as an imaging surface 12a of the imaging element 12. A lens structure of the optical lens group 11c and positions of the respective lenses are only examples.

Figure 11A:
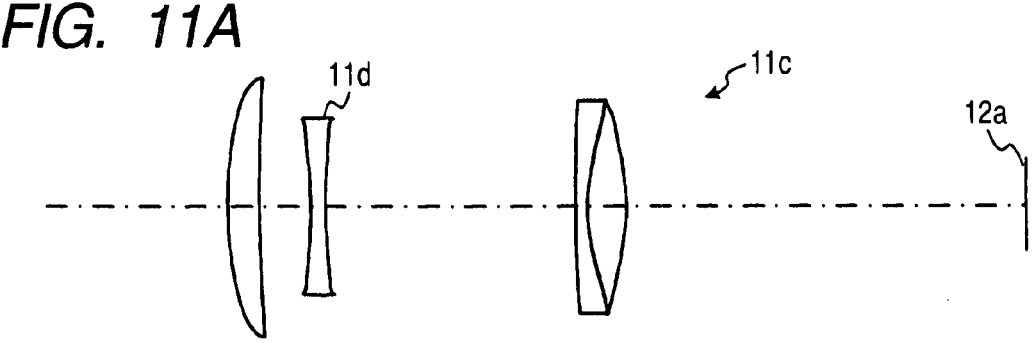
FIGS. 11A to 11D are diagrams for explaining a driving procedure of a focus adjusting lens during imaging of a defocus image.
Figure 11B:
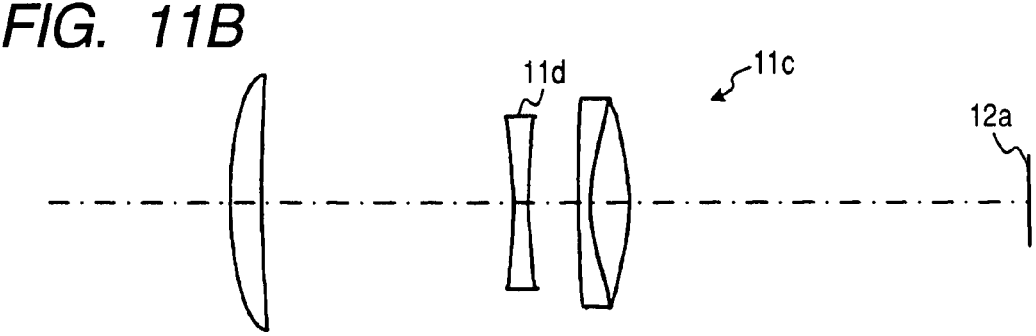

In FIG. 11A, an example of a position of the focus adjustment lens 11d during imaging on an infinite side is shown. In FIG. 11B, an example of a position of the focus adjustment lens 11d during imaging on a macro side is shown. It is known that the tendency of blurring of an image in the defocus state during the imaging on the infinite side is opposite to that during the imaging on the macro side. Therefore, even if the focus adjustment lens 1id is set in the defocus state from only one imaging state, the strong low-pass filter effect is not always obtained. For example, for a subject on which the lens is focused in the imaging on the macro side and the low-pass filter effect is weakened, shift of the focus increases during the imaging on the infinite side and the strong low-pass filter effect is obtained.

Figure 11C:
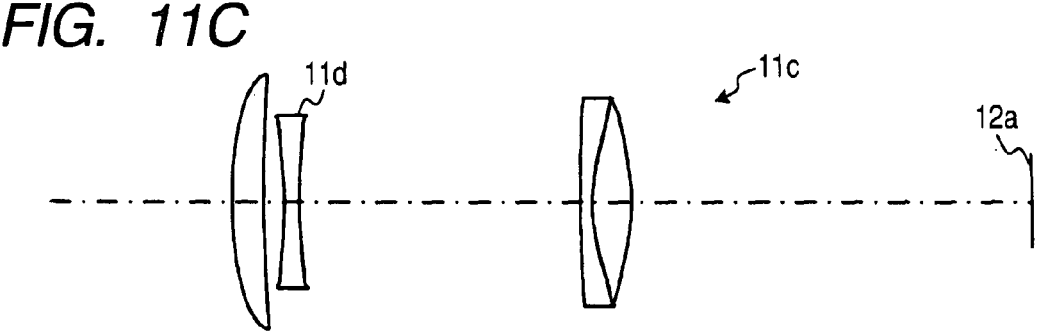
Figure 11D:
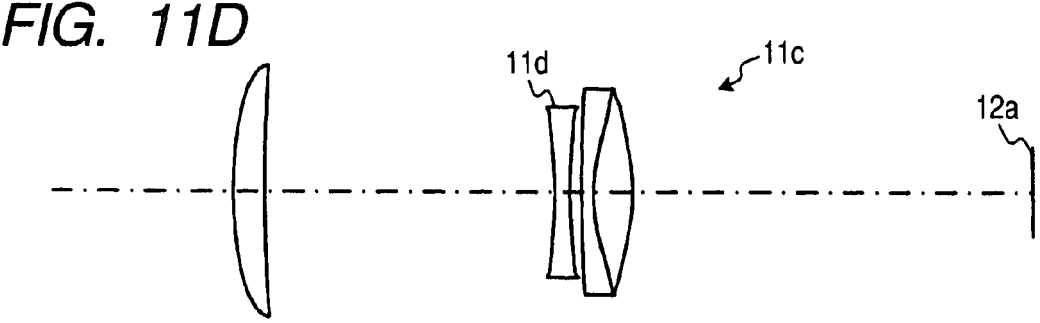

Thus, in this embodiment, the defocus state is created from both the state during the imaging on the infinite side and the state during imaging on the macro side and exposure is performed in the respective states to obtain two defocus images according to the control by the microcomputer 20. Specifically, first, as shown in FIG. 11C, the focus adjustment lens 11d is displaced further to a far end side from the state during the imaging on the infinite side to perform exposure and data of an obtained defocus image is stored in the buffer memory 23. Subsequently, as shown in FIG. 11D, the focus adjustment lens 1id is displaced further to a near end side from the state during the imaging on the macro side to perform exposure and data of an obtained defocus image is stored in the buffer memory 23.

The data of the two defocus images are read out from the buffer memory 23 and the data are averaged to obtain data of a low-pass image according to processing by the weighting-coefficient-generation processing unit 24 (or the microcomputer 20). According to such processing, it is possible to prevent the low-pass filter effect from weakening. The data of the generated low-pass image is stored in the buffer memory 23.

FIG. 10 is referred to again.

[Step S308] The weighting-coefficient-generation processing unit 24 (or the microcomputer 20) analyzes the data of the generated low-pass image and judges whether unnecessary high-frequency components remain in this low-pass image. When unnecessary high-frequency components remain, processing in step S309 is executed. When unnecessary high-frequency components do not remain, processing in step S310 is executed.

[Step S309] When unnecessary high-frequency components remain in the low-pass image, the weighting-coefficient-generation processing unit 24 (or the microcomputer 20) applies low-pass filter processing with a relatively small number of taps in an order of, for example, 5 taps×5 taps to the data of the low-pass image. The data after the processing is stored in the buffer memory 23.

[Step S310] The weighting-coefficient-generation processing unit 24 calculates a weighting coefficient on the basis of the data of the low-pass image stored in the buffer memory 23 and supplies the weighting coefficient to the interpolation processing unit 25. In this case, the weighting-coefficient-generation processing unit 24 calculates a weighting coefficient in accordance with a conversion function for a luminance of the low-pass image and the weighting coefficient shown in FIG. 12. The interpolation processing unit 25 combines, with interpolation, the image data obtained in steps S302, S304, and S306 and stored in the buffer memory 15a using the weighting coefficient and generates data of one HDR image.

Figure 12:
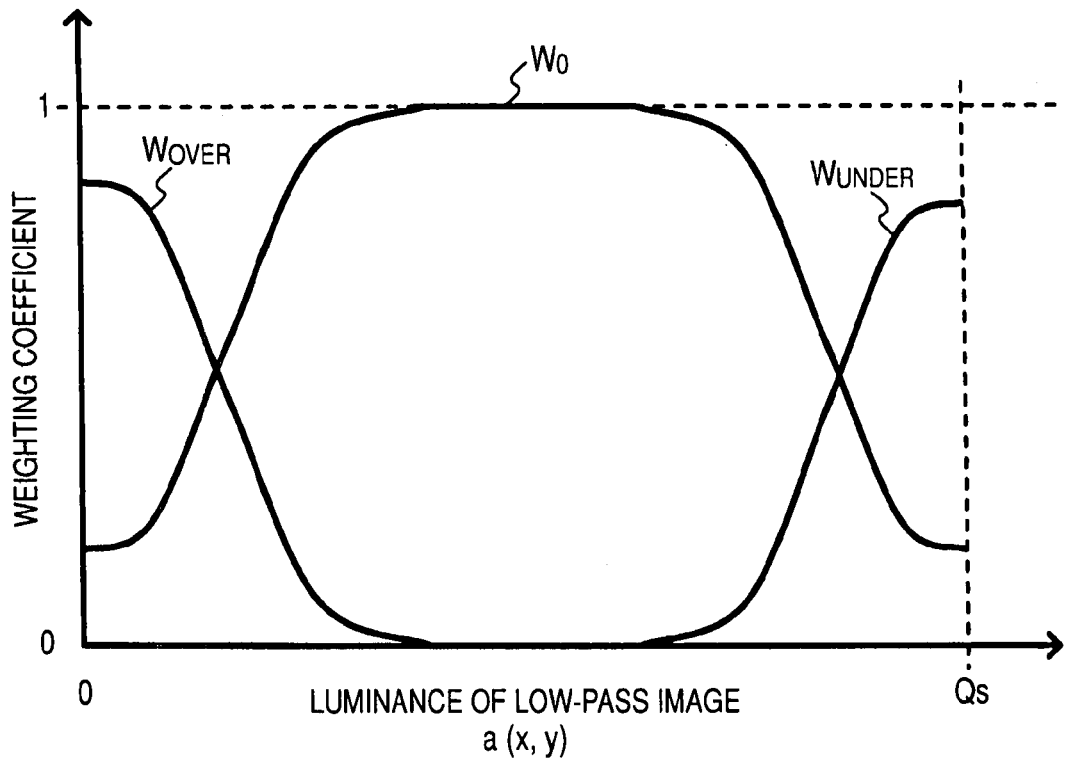
FIG. 12 is a diagram showing an example of a conversion function for converting the luminance of a low-pass image into a weighting coefficient.

FIG. 12 is a diagram showing an example of the conversion function for converting a luminance of the low-pass image into a weighting coefficient.

In FIG. 12, a weighting coefficient $w_0$ is an interpolation coefficient in interpolating the reference image $P'_0$ developed in step S302 in the interpolation processing unit 25. Similarly, weighting coefficients $w_{UNDER}$ and $w_{OVER}$ are interpolation coefficients in interpolating the images $P'_{UNDER}$ and $P'_{OVER}$ developed in steps S304 and S306 in the interpolation processing unit 25, respectively.

The weighting-coefficient-generation processing unit 24 outputs the weighting coefficients $w_0$, $w_{UNDER}$, and $w_{OVER}$ with reference to the conversion function according to luminance data a(x,y) of respective pixels of the low-pass image read out from the buffer memory 23. The interpolation processing unit 25 combines data of the reference image $P'_0$ and the images $P'_{UNDER}$ and $P'_{OVER}$ in the buffer memory 15a in accordance with the following Equation (7) using the weighting coefficients $w_0$, $w_{UNDER}$, and $w_{OVER}$ from the weighting-coefficient-generation processing unit 24.

$$P'(x, y) = \sum_{n \in N} w_n(a(x, y)) \times P'_n(x, y) \quad (7)$$

$$\text{provided that} \sum_{n \in N} w_n(a(x, y)) = 1$$

In Equation (7), P'(x,y) indicates data of respective pixels of the image P' after the combination and $P'_n(x,y)$ indicates data of respective pixels of the image $P'_n$ (i.e., the reference image $P'_0$ and the images $P'_{UNDER}$ and $P'_{OVER}$) stored in the buffer memory 15a. $w_n(a(x,y))$ indicates the weighting coefficients (i.e., the weighting coefficients $w_0$, $w_{UNDER}$, and $w_{OVER}$) applied during combination of the respective pixels of the image $P'_n$.

According to such processing, for a portion on which illumination light is intensely irradiated in a subject, images with a low exposure amount are combined at a high ratio. This makes it possible to incorporate gradation information of a high luminance area, which may be unable to be detected during the imaging of the reference image $P_0$, into an image after combination without expanding a gradation range of image data to the high luminance side. For a portion on which illumination light is faintly irradiated, images with an increased exposure amount are combined at a high ratio. This makes it possible to incorporate gradation information of a low luminance area, which may be unable to be detected during the imaging of the reference image $P_0$, into an image after combination without expanding a gradation range of image data to the low luminance side. As a result, an HDR image having a gradation range and the number of data bits (8 bits) same as those of the image data after the processing in the development processing unit 17a is generated.

A combination ratio of the images obtained by the bracket imaging is determined on the basis of a luminance of illumination components (i.e., a low-pass image) of an imaged image in accordance with the conversion function in FIG. 12. This makes it possible to obtain an effect of compressing a gradation range of image data obtained in a scene with a wide luminance range and enhancing detail components in, in particular, a low luminance area of the low-pass image to improve an overall image quality.

A setting of the conversion function shown in FIG. 12 can be changed according to a characteristic of the low-pass image, various control parameters during the bracket imaging, a characteristic of the images obtained by the bracket imaging, and the like. A method of setting such a conversion function is explained below. Here, as an example, the weighting-coefficient-generation processing unit 24 performs the setting of the conversion function. However, the microcomputer 20 may perform such processing.

Figure 13:
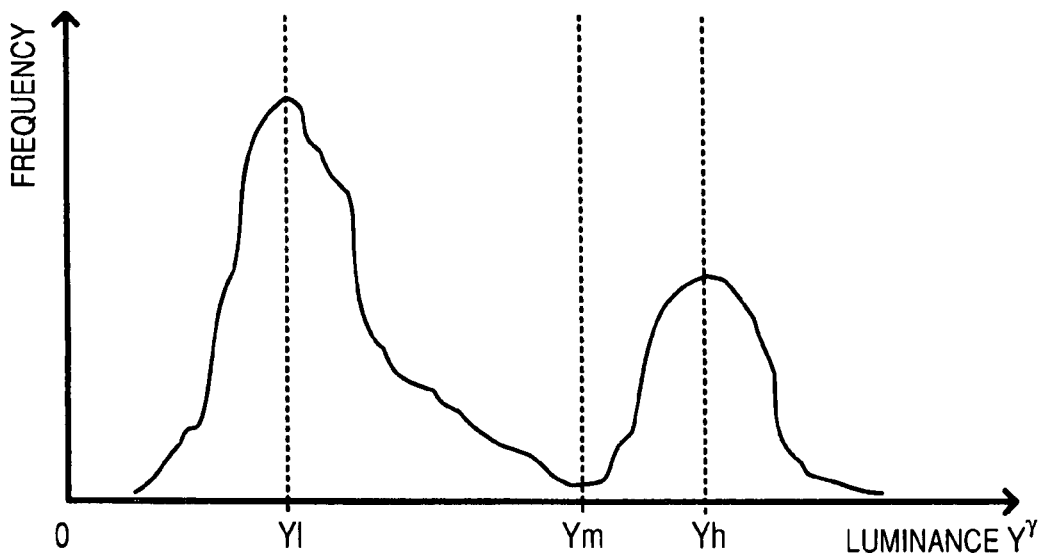
FIG. 13 is a diagram of an example of a histogram that indicates a frequency of a luminance in the low-pass image.

FIG. 13 is a diagram showing an example of a histogram indicating a frequency of a luminance in a low-pass image.

First, the weighting-coefficient-generation processing unit 24 calculates a histogram indicating a frequency of a luminance on the basis of the data of the low-pass image stored in the buffer memory 23. An example of such a histogram is shown in FIG. 13. The histogram is calculated by converting the luminance of the low-pass image into a luminance obtained by applying gamma correction executed by the development processing unit 17a to the luminance. The weighting-coefficient-generation processing unit 24 calculates luminances Yh and Yl at peaks of the frequency from the calculated histogram in order from one having a higher luminance level. The weighting-coefficient-generation processing unit 24 detects a valley of the histogram present between the peaks corresponding to the luminances Yh and Yl and calculates a luminance Ym corresponding to the valley. Here, the luminance Yl is associated with the second peak from the high luminance side. However, the luminance Yl may be associated with a peak further on the low luminance side than the second peak (e.g., a peak furthest on the low luminance side).

The weighting-coefficient-generation processing unit 24 calculates, on the basis of the respective data of the reference image $P'_0$ and the images $P'_{UNDER}$ and $P'_{OVER}$ stored in the buffer memory 23, histograms indicating frequencies of luminances in the respective images. A combined image $P'_-$ of the reference image $P'_0$ and the image $P'_{UNDER}$ and a combined image $P'_+$ of the reference image $P'_0$ and the image $P'_{OVER}$ are considered in accordance with the following Equations (8) and (9) on the basis of parameters detected from these histograms. Note that in the following equations, $0 \leq Kh \leq 1$ and $0 \leq Kl \leq 1$.

$$P'_{-} = Kh \times P'_{UNDER} + (1-Kh) \times P'_0 \qquad (8)$$

$$P'_{+} = Kl \times P'_{OVER} + (1-Kl) \times P'_0 \qquad (9)$$

Figure 14A:
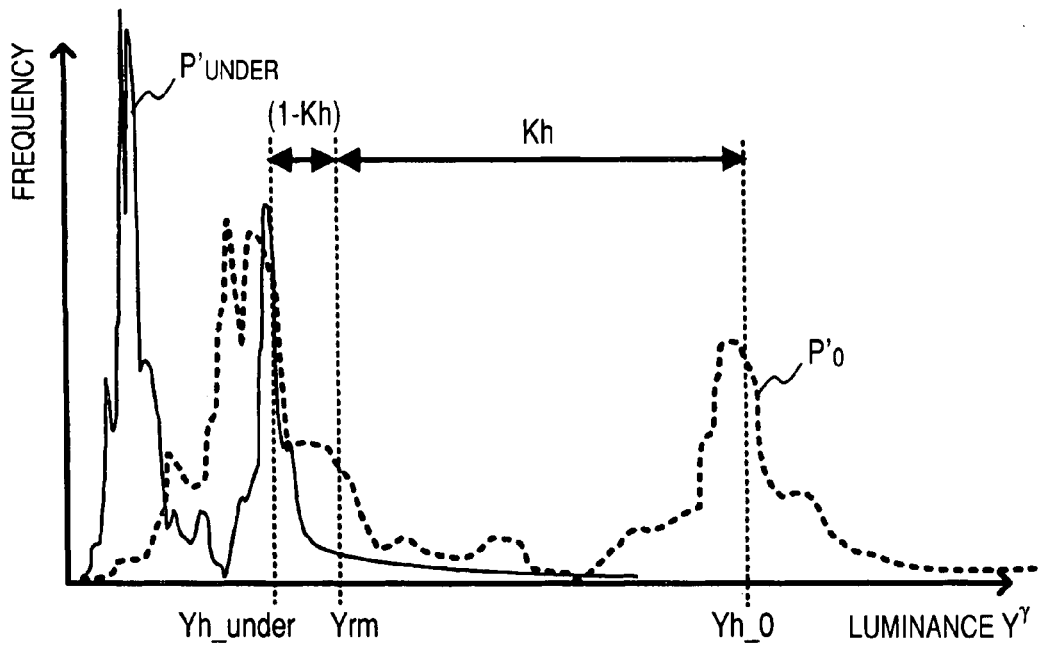
FIGS. 14A and 14B are diagrams showing examples of histograms based on luminances of images obtained by imaging.
Figure 14B:
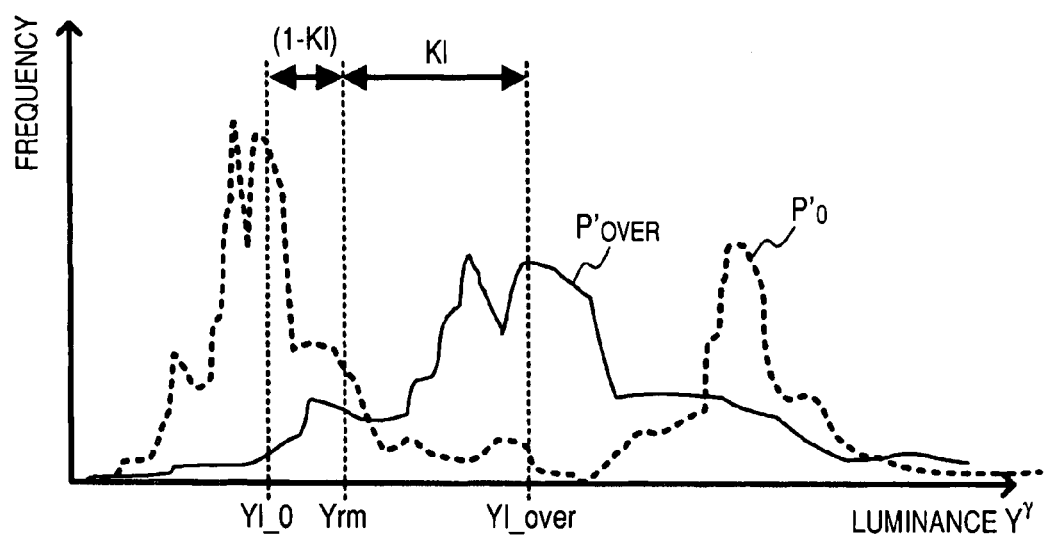

FIGS. 14A and 14B are diagrams showing examples of histograms based on the respective luminances of the reference image $P'_0$ and the images $P'_{UNDER}$ and $P'_{OVER}$.

FIG. 14A shows an example of a histogram corresponding to the reference image $P'_0$ and the image $P'_{UNDER}$. In FIG. 14A, a luminance Yh_0 is a luminance at which a first peak from the high luminance side is present on the histogram of the reference image $P'_0$ and a luminance Yh_under is a luminance at which a first peak from the high luminance side is present on the histogram of the image $P'_{UNDER}$. FIG. 14B shows an example of a histogram corresponding to the reference image $P'_0$ and the image $P'_{OVER}$. In FIG. 14B, a luminance Yl_0 is a luminance at which a second peak from the high luminance side is present on the histogram of the reference image $P'_0$ and a luminance Yl_over is a luminance at which a second peak from the high luminance side is present on the histogram of the image $P'_{OVER}$.

The combined image $P'_{-}$ obtained by combining the reference image $P'_0$ and the image $P'_{UNDER}$ in accordance with Equation (8) is considered. As shown in FIG. 14A, a position of the first peak from the high luminance side on the histogram of the combined image $P'_{-}$ is displaced further to the low luminance side as the weighting coefficient Kh is larger. The weighting-coefficient-generation processing unit 24 calculates the weighting coefficient Kh such that a luminance corresponding to this peak is a luminance Yrm, which is a median value of a luminance range of the low-pass image (i.e., a range of a maximum luminance and a minimum luminance in the low-pass image).

Similarly, the combined image $P'_{+}$ obtained by combining the reference image $P'_0$ and the image $P'_{OVER}$ in accordance with Equation (9) is considered. As shown in FIG. 14B, a position of the second peak from the high luminance side on the histogram of the combined image $P'_{+}$ is displaced further to the high luminance side as the weighting coefficient Kl is larger. The weighting-coefficient-generation processing unit 24 calculates the weighting coefficient Kl such that a luminance corresponding to this peak is the luminance Yrm, which is the median value of the luminance range of the low-pass image. Here, as an example, the luminance corresponding to the second peak from the high luminance side on the histogram of the combined image $P'_{+}$ is used. However, the calculation may be performed using a luminance corresponding to a peak further on the low luminance side than the second peak (e.g., a peak furthest on the low luminance side).

According to the calculation, an appropriate maximum combination ratio of the images $P'_{UNDER}$ and $P'_{OVER}$ with respect to the reference image $P'_0$ is calculated. This maximum combination ratio defines a maximum compression amount of gradation ranges on the low luminance side and the high luminance side. By calculating the maximum combination ratio on the basis of the luminance Yrm, it is possible to keep a satisfactory balance between a compression effect of the gradation ranges and a sense of contrast.

The combined images $P'_{-}$ and $P'_{+}$ are blended according to a luminance of the low-pass image using the weighting coefficients Kh and Kl. This blend processing is executed in accordance with the following Equation (10) using, for example, a monotone increasing function f(Y). Note that $0 \leq Kg \leq 1$.

$$P' = (0.5 + Kg \times f(Y)) \times P'_{-} + (0.5 - Kg \times f(Y)) \times P'_{+} \qquad (10)$$

Figure 15:
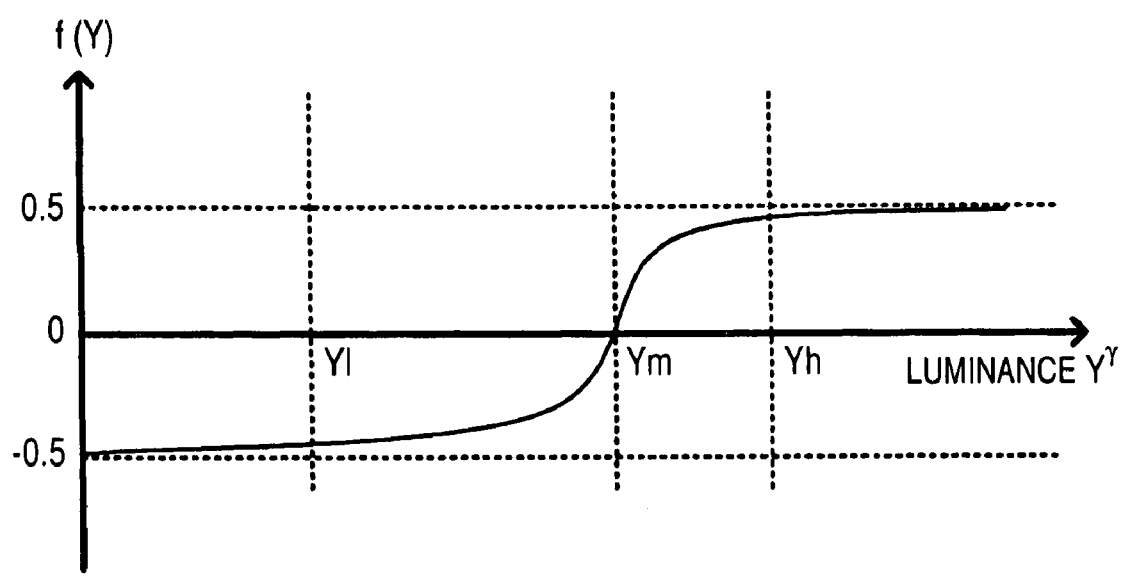
FIG. 15 is a diagram showing an example of a monotone increasing function.

FIG. 15 is a diagram showing an example of the monotone increasing function f(Y).

The weighting-coefficient-generation processing unit 24 defines the monotone increasing function f(Y) such that, as shown in FIG. 15, f(Ym) is 0 and both tilts at f(Yh) and f(Yl) are sufficiently small. According to this condition and the method of calculating the weighting coefficients Kh and Kl described above, it is possible to weaken the influence of the gradation range compression on a luminance area in which a peak of a histogram is present (i.e., a luminance area occupying a large area in the low-pass image) and prevent gradation in the area from being lost to improve an image quality in the combined process.

It is possible to adjust a sense of contrast represented in the image P' after the combination by changing a parameter Kg in Equation (10). When the parameter Kg is 1, the combination ratio of the images $P'_{UNDER}$ and $P'_{OVER}$ with respect to the reference image $P'_0$ is maximized and the effect of the gradation range compression is maximized (i.e., the contrast is minimized). When the parameter Kg is 0, the contrast is maximized. As the parameter Kg, an optimum value can be determined by the weighting-coefficient-generation processing unit 24 with reference to a LUT or the like according to an exposure correction amount during the bracket imaging or according to a ratio of the luminance Yh and the luminance Yl. For example, as the exposure correction amount is smaller or the value of Yh/Yl is smaller, the parameter Kg is set to a smaller value. The parameter Kg can be adjusted by an operation input by the user.

The weighting-coefficient-generation processing unit 24 can set a conversion function for calculating the weighting coefficient $w_n(a(x,y))$ from Equations (8) to (10) using the weighting coefficients Kh and Kl, the monotone increasing function f(Y), and the parameter Kg calculated as described above. According to such a method of setting a conversion function, by setting the conversion function on the basis of peaks of histograms of respective images, it is possible to surely leave gradation in the luminance area occupying a large area in the low-pass image and, as a result, obtain a high quality image. It is also possible to adjust a sense of contrast reproduced in the image P' after the combination, further improve a quality of an image, and improve a degree of freedom of setting by the user on the basis of characteristics of the low-pass image or the exposure correction amount during the bracket imaging and according to setting by the user.

FIG. 10 is referred to again.

[Step S311] The HDR image data after the combination is subjected to compression and encoding processing by the encoding processing unit 17b and recorded on the recording unit 18 as JPEG data of the HDR image.

In the third embodiment explained above, the data of the reference image $P_0$ and the images $P_{UNDER}$ and $P_{OVER}$ are developed by the development processing unit 17a every time the reference image $P_0$ and the images $P_{UNDER}$ and $P_{OVER}$ are imaged. Thus, a circuit of the existing development processing unit 17a can be used as it is when an HDR image is generated. For example, in the interpolation processing by the interpolation processing unit 25, under a condition in which a weighting coefficient has a positive value, the interpolation processing can be executed in a range of a bit width same as that during the normal imaging. Unlike the first embodiment, image data (equivalent to output data from the combination processing unit 16; e.g., 15-bit data) having a bit width larger than the image data (e.g., 12-bit data) processed by the development processing unit 17a is not generated. Thus, it is possible to generate an HDR image also using a processing system before the development processing unit 17a as it is. Therefore, it is possible to obtain a high-quality HDR image while controlling a circuit size and manufacturing cost.

The method of combining images obtained by the bracket imaging used in the embodiment can also be applied to image data recorded in a recording medium rather than during imaging in an imaging apparatus. In this case, in the recording medium, plural image data with different exposure conditions obtained by the bracket imaging and information on the exposure conditions during imaging of the image data are recorded. The respective image data are combined on the basis of the information on the exposure conditions to generate one HDR image. Such a combination processing function may be realized by not only the imaging apparatus but also by, for example, an image processing program executed by a PC.

It is desirable that an exposure condition during the bracket imaging is determined by a method same as that in this embodiment. However, even if the combination processing is performed on the basis of an exposure condition determined by other methods, it is possible to generate an HDR image. For example, a method of shifting an exposure control value from an exposure condition during imaging of a reference image to both an under side and an over side by the number of correction stages decided in advance and performing the bracket imaging may be adopted. Therefore, an image processing program for realizing such a combination processing function can be a general-purpose program that does not depend on a model of an imaging apparatus that performs the bracket imaging and a manufacturer of the imaging apparatus.

When the images after the imaging are combined in this way, it is difficult to adopt the optical method described above for the acquisition of the low-pass image. Thus, it is necessary to realize the low-pass filter processing according to a digital arithmetic operation.

Fourth Embodiment

In a scene with a wide luminance range, since plural light sources are present, it may be difficult to automatically adjust a white balance properly. For example, the proper automatic adjustment of a white balance is difficult when illumination by bulbs in a room and illumination by the sun in the outdoor are simultaneously included in an angle of view. When imaging is performed under such a complicated condition, if a gain value of a white balance is fixed in the angle of view, a subject and an imaged image look differently.

In the third embodiment described above, data of maximum three images obtained by the bracket imaging are subjected to the development processing by the development processing unit 17a and stored in the buffer memory 15a. In the white balance adjustment in the development processing unit 17a, estimation of a light source is individually performed from the respective image data and a white balance gain corresponding to a result of the estimation is calculated. In this embodiment, in such a case, white balance gains for the respective image data are optimized for each of pixels on the basis of the weighting coefficient generated by the weighting-coefficient-generation processing unit 24 to make it possible to cope with white balance adjustment even when a condition of illumination is complicated.

The structure of a DSC according to this embodiment is realized by components substantially the same as those of the DSC shown in FIG. 9. However, when the microcomputer 20 calculates a white balance gain, the microcomputer 20 needs to be capable of acquiring a weighting coefficient generated by the weighting-coefficient-processing unit 24. In this embodiment, when the bracket imaging is performed, a weighting coefficient needs to be generated by the weighting-coefficient-generation processing unit 24. Thus, it is desirable to perform imaging of a defocus image and store image data of the defocus image in the buffer memory 23 immediately before the bracket imaging is performed. Alternatively, it is also possible that a defocus image is acquired at every fixed time and, after the bracket imaging is performed, a weighting coefficient is generated using data of a latest defocus image stored in the buffer memory 23. Instead of performing the imaging of a defocus image, when the reference image $P_0$ is imaged by the bracket imaging, the low-pass filter processing may be applied to data of the reference image $P_0$ by a digital arithmetic operation to store a low-pass image in the buffer memory 23.

The microcomputer 20 calculates detection values for auto white balance for an R component, a G component, and a B component of images $P_n$ (i.e., the reference image $P_0$ and the images $P_{UNDER}$ and $P_{OVER}$) in accordance with the following Equations (11-1) to (11-3) on the basis of the weighting coefficient obtained from the weighting-coefficient-generation processing unit 24. The microcomputer 20 calculates white balance gains for the respective components using the detection values. White balance adjustment using the calculated gain is performed in accordance with Equation (12). Consequently, gains different for each of pixels are applied.

$$\overline{R_n} = \left\{\sum_{x,y} w_n(a(x, y)) \times R_n(x, y)\right\} \div \left\{\sum_{x,y} w_n(a(x, y))\right\} \quad (11\text{-}1)$$

$$\overline{G_n} = \left\{\sum_{x,y} w_n(a(x, y)) \times G_n(x, y)\right\} \div \left\{\sum_{x,y} w_n(a(x, y))\right\} \quad (11\text{-}2)$$

$$\overline{B_n} = \left\{\sum_{x,y} w_n(a(x, y)) \times B_n(x, y)\right\} \div \left\{\sum_{x,y} w_n(a(x, y))\right\} \quad (11\text{-}3)$$

$$\begin{bmatrix} R'_n(x, y) \\ G'_n(x, y) \\ B'_n(x, y) \end{bmatrix} = WB_n \cdot \begin{bmatrix} R_n(x, y) \\ G_n(x, y) \\ B_n(x, y) \end{bmatrix} \quad (12)$$

$$\text{provided that } WB_n = \begin{bmatrix} \overline{G_n}/\overline{R_n} & 0 & 0 \\ 0 & 1 & 0 \\ 0 & 0 & \overline{G_n}/\overline{B_n} \end{bmatrix}$$

In Equations (11-1) to (11-3), detection values of the respective components, i.e., integration values of pixel data multiplied with the weighting coefficient are divided by addition values of the weighting coefficient in the entire image and averaged. $R_n$, $G_n$, and $B_n$ indicate R components, G components, and B components in the respective images $P_n$. In Equation (12), $WB_n$ indicates gain coefficients corresponding to the respective images $P_n$.

In the bracket imaging, after data of the reference image $P'_0$ and the images $P'_{UNDER}$ and $P'_{OVER}$ subjected to the white balance adjustment as described above are stored in the buffer memory 15a, image data of the images are combined by the interpolation processing unit 25 in accordance with Equation (7). As a result, since the white balance gain smoothly changes for each of the pixels according to the intensity of illumination light, it is possible to perform white balance adjustment adapted to illumination light for each of portions of an image. In particular, when imaging is performed in a scene in which plural illumination lights are present, an image is prevented from becoming unnatural because of an error in estimation of a light source.

For example, when a large amount of sunlight is irradiated on a relatively bright area of a scene and a large amount of bulb light is irradiated on a relatively dark area of the scene, white balance adjustment is applied to the image P'$_{UNDER}$ on the assumption that a light source is the sunlight and white balance adjustment is applied to the image P'$_{OVER}$ on the assumption that a light source is the bulb light. White balance adjustment adapted to a light source in which the respective light sources are mixed is applied to the reference image P'$_0$. When these images are combined in accordance with Equation (7), in the areas on which a larger amount of the sunlight and a larger amount of the bulb light are irradiated, respectively, images subjected to the white balance adjustment adapted to the light sources are combined at a high ratio. Therefore, light sources are accurately assumed in the respective areas. Since a weighting coefficient corresponding to a luminance of illumination components is used, images adjusted to the respective light sources can be smoothly combined without incongruity.

In the embodiments described above, the interpolation processing is applied to the image P'$_n$ after the white balance adjustment by the interpolation processing unit 25. However, the same white balance processing for each of the pixels may be applied to the image P$_n$ (RAW image) before development. A gain coefficient WB(x,y) for each of the pixels in this case is obtained by the following Equation (13).

$$WB(x, y) = \gamma^{-1}\left(\sum_n w_n(a(x, y)) \times \gamma(WB_n)\right) \quad (13)$$

In Equation (13), a gamma conversion curve in the development processing unit 17a is represented as a function γ(A) and an inverse function of the gamma conversion curve is represented as a function γ$^{-1}$(A).

Fifth Embodiment

In the embodiments described above, when it is judged from a measurement result or an estimation result of a luminance range of a scene that the bracket imaging is necessary, the bracket imaging is performed using a proper exposure correction value corresponding to the luminance range to generate an HDR image. However, it is also possible to perform exposure only once using the exposure correction value calculated in this way and generate an HDR image from obtained one image. For example, when images obtained by performing imaging plural number of times are combined as described above, if a subject moves during each imaging time, a quality of a combined image is deteriorated. However, when the imaging is performed only once, such a problem does not occur. A method of generating an HDR image by performing imaging once is explained below.

In a fifth embodiment of the present invention, a DSC that applies the image interpolation method used in the third embodiment and generates an HDR image by performing imaging once is explained.

Figure 16:
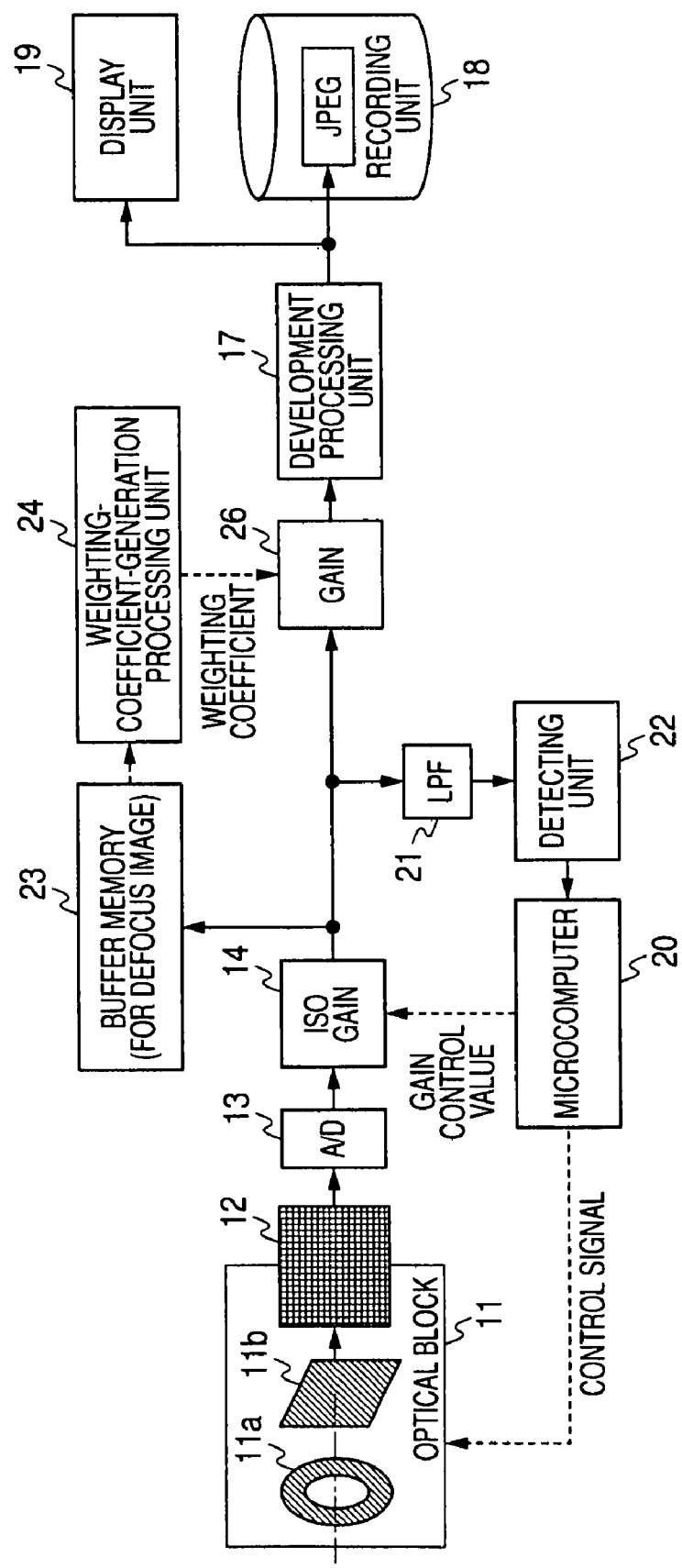
FIG. 16 is a block diagram showing an internal structure of a DSC according to a fifth embodiment of the present invention.

FIG. 16 is a block diagram showing an internal structure of the DSC according to the fifth embodiment. In FIG. 16, blocks corresponding to those in FIGS. 1 and 9 are denoted by the same reference numerals and signs and explanation of the blocks is omitted.

In the DSC shown in FIG. 16, instead of the interpolation processing unit 25 of the DSC shown in FIG. 9, a gain control unit 26 that performs gain control for each of the pixels using a weighting coefficient from the weighting-coefficient-generation processing unit 24 is provided. The development processing unit 17 includes even the encoding processing function as in the first embodiment.

The DSC according to this embodiment measures or estimates a luminance range of a scene according to the method explained in the first or second embodiment. After it is judged that the bracket imaging is necessary, the DSC performs exposure by applying only the exposure correction value EV$_{UNDER}$ adapted to the maximum luminance Y$_H$ among the exposure correction values calculated in step S301 in FIG. 10. Data of the obtained image P$_{UNDER}$ (RAW image data) is supplied to the gain control unit 26 and subjected to gain control using a weighting coefficient from the weighting-coefficient-generation processing unit 24, whereby an HDR image is generated.

As in the fourth embodiment, in this embodiment, it is necessary to image a defocus image before imaging the image P$_{UNDER}$ and store image data of the defocus image in the buffer memory 23 to make it possible to generate a weighting coefficient from image data of the buffer memory 23 when the image P$_{UNDER}$ is imaged. Alternatively, it is also possible that a buffer memory that temporarily stores data of the imaged image P$_{UNDER}$ is provided and a defocus image is imaged after the imaging of the image P$_{UNDER}$ and, then, a weighting coefficient is generated. It is also possible that, instead of imaging a defocus image, low-pass filter processing is performed by a digital arithmetic operation and data of an obtained low-pass image is stored in the buffer memory 23. In this case, it is desirable that an image as an object of the low-pass filter processing is the reference image P$_0$ obtained by new exposure. However, the image P$_{UNDER}$ may be substituted for the reference image P$_0$.

The gain control unit 26 applies, for each of the pixels, the gain G(x,y) calculated according to the following Equation (14) to the image P$_{UNDER}$ obtained by the imaging.

$$G(x,y) = \gamma^{-1}(w_{UNDER}(a(x,y)) + w_0(a(x,y))\gamma(2^{-EV_{UNDER}}) + w_{OVER}(a(x,y))\gamma(2^{-EV_{UNDER}+EV_{OVER}})) \quad (14)$$

The calculation according to Equation (14) is equivalent to converting exposure control values in imaging the reference image P$_0$ and the images P$_{UNDER}$ and P$_{OVER}$ into gain values, respectively, with respect to the image P$_{uNDER}$, simulatively acquiring the reference image P$_0$ and the images P$_{UNDER}$ and P$_{OVER}$ according to a change in an application amount of again, and combining the images at a combination ratio based on the conversion function in the third embodiment (see FIG. 12) according to brightness of a low-pass image. Therefore, as in the third embodiment, for a portion on which illumination light is intensely irradiated of a subject, signal components equivalent to images with a low exposure amount are combined at a high ratio and, for a portion on which illumination light is faintly irradiated, signal components equivalent to images with an increased exposure amount are combined at a high ratio. An HDR image after the gain control has the number of bits (e.g., 12 bits) that can be directly processed by the development processing unit 17.

However, in such a procedure, since only one imaging is performed, information in a luminance range of a scene exceeding the dynamic range of the output of the imaging element 12 is not actually incorporated. Therefore, in terms of a luminance range that can be reproduced and a large amount of noise, an image quality is inferior to that of the image obtained by performing the bracket imaging as in the third embodiment.

In the fifth embodiment, the gain control is performed in accordance with Equation (14) during the imaging of the image $P_{UNDER}$ to obtain the HDR image. However, regarding RAW image data imaged and recorded in a recording medium in the past as data of the image $P_{UNDER}$, the same method can be applied to the RAW image data.

In this case, it is necessary that the exposure correction value $EV_{UNDER}$ with respect to the imaging of the reference image $P_0$ when the image $P_{UNDER}$ is imaged and the exposure correction value $EV_{OVER}$ during the imaging of the image $P_{OVER}$ can be acquired. The exposure correction value $EV_{UNDER}$ can be acquired by, for example, adding and recording the exposure correction value $EV_{UNDER}$ as metadata of a data file of the image $P_{UNDER}$ during the imaging of the image $P_{UNDER}$.

The exposure correction value $EV_{OVER}$ only has to be estimated from, for example, the acquired exposure correction value $EV_{UNDER}$. As a method of estimation, for example, it is possible to use the method of estimating an exposure correction value using the cumulative histogram explained in the second embodiment. When the exposure correction value $EV_{UNDER}$ is obtained, the image $P_{UNDER}$ is inversely corrected on the basis of the value to calculate the reference image $P_0$, and a cumulative histogram of luminances of the reference image $P_0$ is calculated. The exposure correction value $EV_{OVER}$ can be estimated in accordance with FIG. 7 and the $EV_{OVER}$ determination table in Table 2.

When it is difficult to obtain the exposure correction value $EV_{UNDER}$, the exposure correction values $EV_{UNDER}$ and $EV_{OVER}$ may be estimated by analyzing input image data. For example, the exposure correction values $EV_{UNDER}$ and $EV_{OVER}$ can be estimated by applying a gain to the input image data and converting limit values of gains at which ratios of white void pixels and black solid pixels in an image are equal to or lower than predetermined thresholds into the exposure correction values $EV_{UNDER}$ and $EV_{OVER}$, respectively. The exposure correction values $EV_{UNDER}$ and $EV_{OVER}$ can also be estimated by analyzing an input image according to a method of using a cumulative histogram same as the method described above. Although it is likely that deterioration in an image quality increases, both the exposure correction values $EV_{UNDER}$ and $EV_{OVER}$ may be determined as fixed numbers of correction stages.

When the inputted reference image $P_0$ is analyzed to estimate the exposure correction values $EV_{UNDER}$ and $EV_{OVER}$, in Equation (14), by transforming a multiplication coefficient multiplied with $w_{UNDER}(a(x,y))$, $w_0(a(x,y))$, and $w_{OVER}(a(x,y))$ into $\gamma(2^\wedge EV_{UNDER})$, 1, and $\gamma(2^\wedge EV_{OVER})$, respectively, this gain can be directly applied to an input image ("2^B" indicates Bth power of 2").

A low-pass image necessary for obtaining an HDR image in accordance with equation (14) only has to be acquired by inversely correcting an input image on the basis of the exposure correction value $EV_{UNDER}$ to obtain the reference image $P_0$ and applying the low-pass filter processing to the reference image $P_0$. Alternatively, in order to simplify the processing, the low-pass image may be acquired by applying the low-pass filter processing to the input image.

According to the methods described above, it is possible to generate an HDR image from any image data recorded in a recording medium regardless of whether exposure correction is performed during imaging. Such a gain control processing function for existing image data can be not only implemented in the imaging apparatus but also realized as, for example, an image processing program for developing RAW image data.

Moreover, the processing for generating an HDR image according to the fifth embodiment also realizes an effect that a gradation range can be compressed while a satisfactory quality of an input image is kept as in the method explained with reference to FIG. 5 in the first embodiment. Therefore, for example, with inputted data of the image $P_{UNDER}$ set as RAW image data not having the number of bits (12 bits) that can be processed by the development processing unit 17 but having the number of bits (e.g., 15 bits) larger than 12 bits and having an expanded gradation range, the gain control processing may be applied to this RAW image data. In this case, it is possible to further improve an image quality when the number of data bits is compressed after the gain control processing.

According to Equation (14), a weighting coefficient corresponding to an exposure correction amount further on a plus side is multiplied with a larger coefficient corresponding to the exposure correction amount. For example, $w_0(a(x,y))$ is multiplied with a larger coefficient than $w_{UNDER}(a(x,y))$ and $w_{OVER}(a(x,y))$ is multiplied with a larger coefficient than $w_0(a(x,y))$. On the other hand, according to the conversion function in FIG. 12, regardless of brightness of a low-pass image, an added-up value of all weighting coefficients "$w_{UNDER}(a(x,y))+w_0(a(x,y))+w_{OVER}(a(x,y))$" is "1".

Therefore, a gain calculated according to Equation (14) is high in a low luminance area of the low-pass image and low in a high luminance area of the low-pass image and basically changes substantially the same manner as the gain curve shown in FIG. 6A. The luminances Y1, Y2, and Y3 shown in FIGS. 6A and 6B can be associated with the luminances Yl, Ym, and Yh in FIG. 13, respectively. Therefore, as in the explanation with reference to FIG. 5 and FIGS. 6A and 6B, the effect of the gradation range compression for illumination components and the effect of the gradation range expansion for reflectance components in a low luminance area (i.e., the effect of enhancement of detail components) are realized. It is possible to improve a quality of an image when the number of bits is compressed after gain application.

As in FIG. 5, it is also possible that separate gains are applied to illumination components and reflectance components of an input image, a gain calculated according to Equation (14) is applied to the illumination components, again obtained by multiplying the gain calculated according to Equation (14) with a gain for detail component enhancement shown in FIG. 6B is applied to the reflectance components, and the illumination components and the reflectance components are combined.

Moreover, it is also possible to analyze an input image to which the gain calculated according to Equation (14) is applied and calculate an appropriate weighting coefficient using the method explained with reference to FIGS. 13 and 15. For example, after obtaining, with an arithmetic operation, a low-pass image by subjecting the reference image $P_0$ to the low-pass filer processing on the basis of a signal of the input image, a histogram of the low-pass image is calculated, the luminances Yl, Ym, and Yh are calculated on the basis of a peak position of the histogram, and a conversion function for a weighting coefficient is set according to the luminances. In this case, by applying multiplication coefficients multiplied with $w_{UNDER}(a(x,y))$, $w_0(a(x,y))$ and $w_{OVER}(a(x,y))$ of Equation (14), respectively, as gains for input image data, it is possible to simulatively obtain the reference image $P_0$ and the images $P_{UNDER}$ and $P_{OVER}$ and detect histograms of the images.

Consequently, it is possible to weaken the influence of the gradation range compression on a luminance area occupying a large area in the low-pass image and prevent gradation in this area from being lost. It is possible to adjust a sense of contrast in an image after the gain control by arbitrarily changing the parameter Kg in Equation (10).

The gain control processing function as a pre-processing function of bit compression described above can be incorporated in, for example, an imaging apparatus. Actually, image data processed in the imaging apparatus (12-bit data or 15-bit data in the example described above) often has a large number of bits compared with image data adapted to a display device and the like (8-bit data in the example described above). Thus, it is preferable to perform the gradation range compression with the gain control processing function before compressing the number of bits of such image data.

Moreover, the functions can also be realized as an image processing program for processing RAW image data having a large number of bits obtained by such an imaging apparatus in a PC and the like. In this case, the RAW image data can be realized not only as an image processing program exclusive for imaging apparatus of specific models and specific manufacturers but also as a general purpose image processing program not depending on models and manufacturers of such imaging apparatuses. It is possible to improve a quality of an image after RAW development processing by executing the program.

Sixth Embodiment

In a sixth embodiment of the present invention, after an ISO gain and respective adjustment amounts of noise reduction (NR) processing are changed with respect to an image obtained by one imaging to generate plural images, the images are combined to generate one HDR image.

Figure 17:
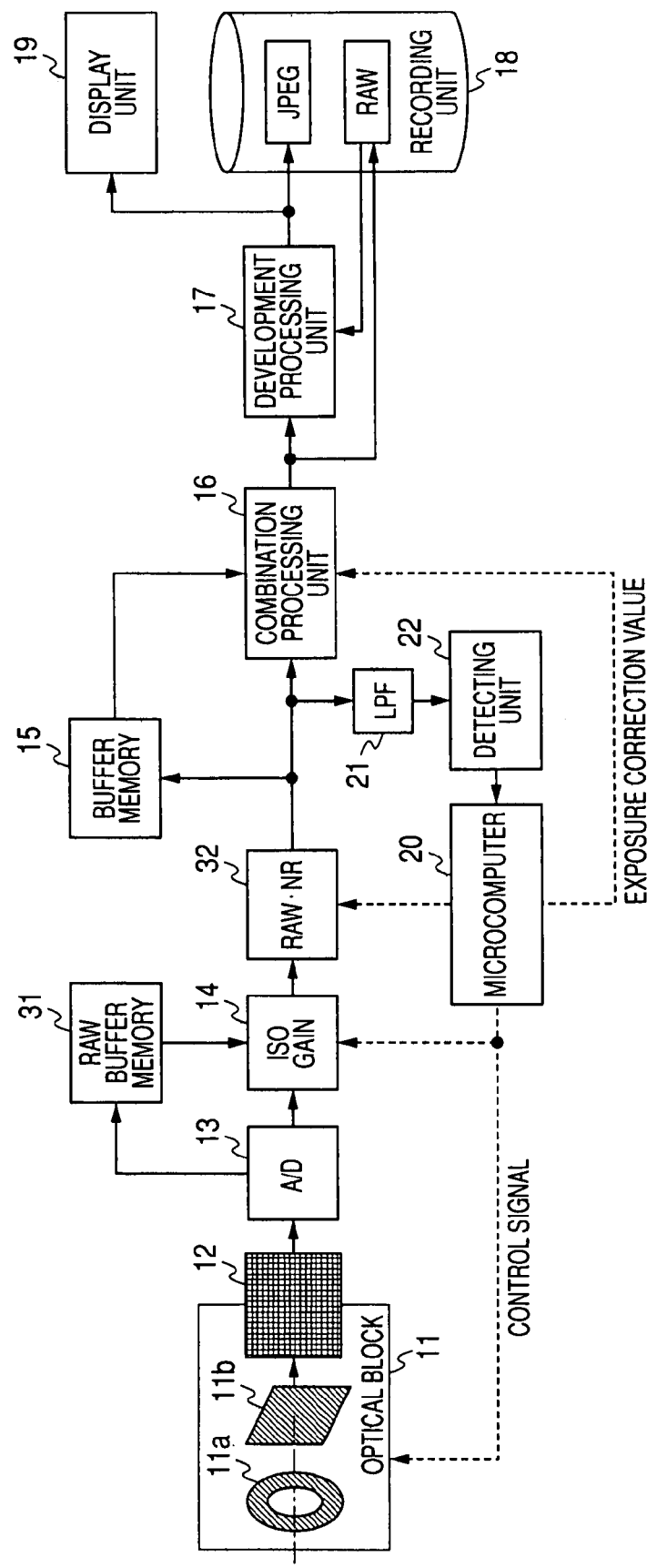
FIG. 17 is a block diagram showing an internal structure of a DSC according to a sixth embodiment of the present invention.

FIG. 17 is a block diagram showing an internal structure of a DSC according to the sixth embodiment. In FIG. 17, blocks corresponding to those in FIG. 1 are denoted by the same reference numerals and signs and explanation of the blocks is omitted.

In the DSC shown in FIG. 17, a buffer memory for RAW image data (a RAW buffer memory) 31 and an NR processing unit for RAW image data (a RAW/NR processing unit) 32 are added to the components of the DSC shown in FIG. 1. Digital data of an imaged image (RAW image data), which is outputted from the A/D conversion unit 13 when it is judged that a luminance range on a high luminance side of a scene is wider than the dynamic range of the output of the imaging element 12, is stored in the RAW buffer memory 31. After being subjected to gain control for an entire image by the ISO gain control unit 14, the image data in the RAW buffer memory 31 is further subjected to NR processing by the RAW/NR processing unit 32 and stored in the buffer memory 15.

Figure 18:
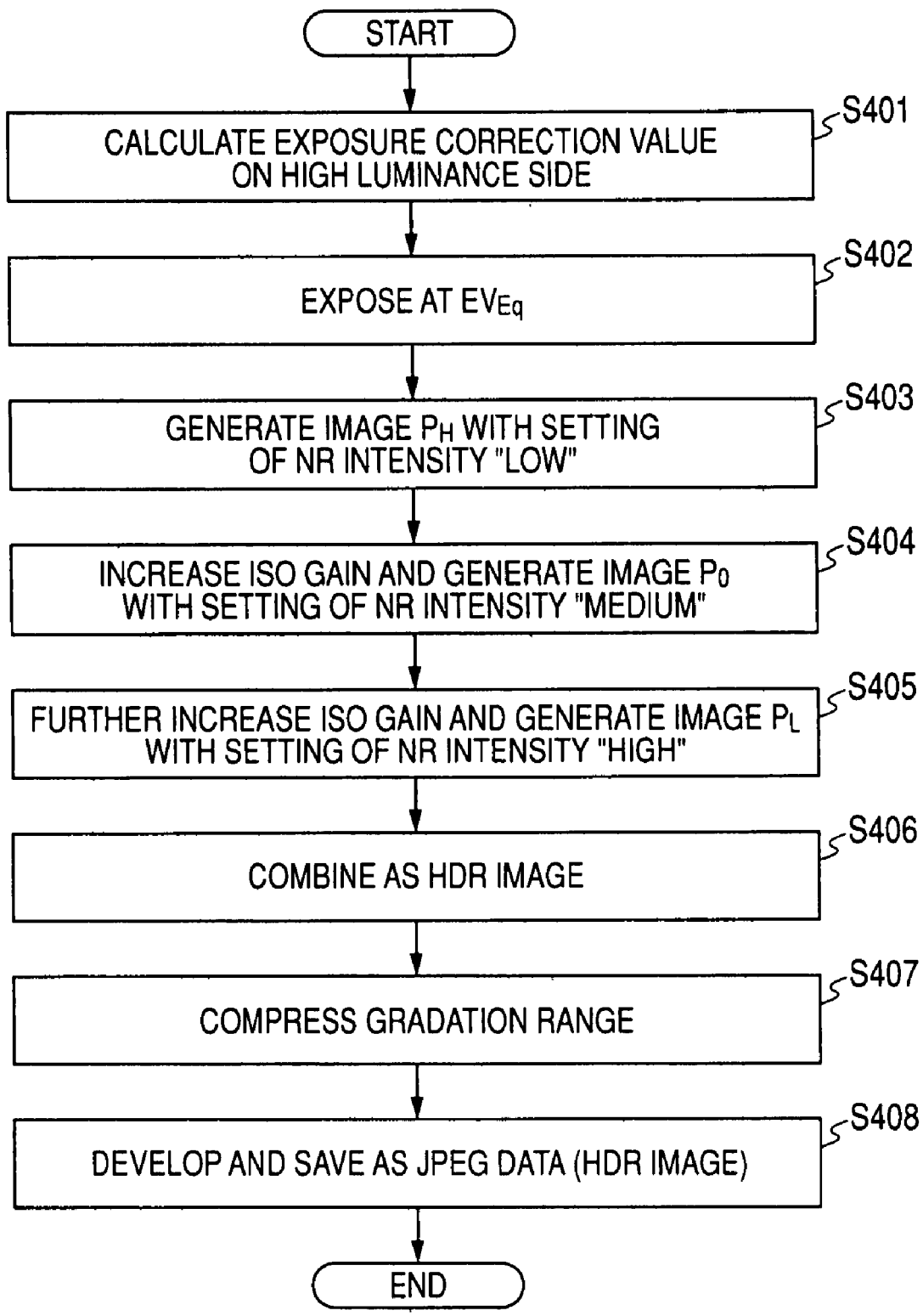
FIG. 18 is a flowchart showing a processing procedure during imaging in the DSC according to the sixth embodiment.

FIG. 18 is a flowchart showing a processing procedure during imaging in the DSC according to the sixth embodiment.

The DSC according to this embodiment measures a luminance range of a scene according to, for example, the method explained in the first embodiment and judges, according to a result of the measurement, whether the processing in FIG. 18 should be started. This judgment processing corresponds to the processing for judging whether the bracket imaging is necessary in step S107 in FIG. 2. However, in this embodiment, the processing in FIG. 18 is started when it is judged that a luminance range on the high luminance side of the scene is wider than the dynamic range of the output of the imaging element 12.

[Step S401] The microcomputer 20 calculates an exposure correction value $EV_{Eq}$ adapted to the measured maximum luminance YH in accordance with the following Equation (15). In this case, the microcomputer 20 calculates shutter speed S (here, the microcomputer 20 mainly controls an operation of the shutter 11$b$) and an aperture value F during imaging in the next step S402 in accordance with the following Equation (16). As described above, $S_0$, $F_0$, and $G_0$ are shutter speed (by an electronic shutter function), an aperture value, and an ISO gain set during the AE control in step S101 in FIG. 2 (or set in step S103 again).

$$EV_{Eq} = -\log_2(Y_H/Y_{DH}) \tag{15}$$

$$S \div F = (S_0 \div F_0 \times \sqrt{G_0}) \times 2^{EV_{Eq}}/2 \tag{16}$$

[Step S402] The microcomputer 20 applies the exposure correction value $EV_{Eq}$, the shutter speed S, and the aperture value F calculated in step S401 and causes the DSC to execute an exposure operation. RAW image data outputted from the A/D conversion unit 13 by this operation is temporarily stored in the RAW buffer memory 31.

[Step S403] The microcomputer 20 sets an ISO gain in the ISO gain control unit 14 to "1" (i.e., no gain), sets NR intensity in the RAW/NR processing unit 32 to "weak", causes the ISO gain control unit 14 and the RAW/NR processing unit 32 to sequentially process image data in the RAW buffer memory 31, and stores an image $P_H$ after the processing in the buffer memory 15.

[Step S404] The microcomputer 20 increases the ISO gain in the ISO gain control unit 14, increases the NR intensity in the RAW/NR processing unit 32 to "medium", causes the ISO gain control unit 14 and the RAW/NR processing unit 32 to sequentially process the image data in the RAW buffer memory 31, and stores the image $P_O$ after the processing in the buffer memory 15.

[Step S405] The microcomputer 20 further increases the ISO gain in the ISO gain control unit 14, further increases the NR intensity in the RAW/NR processing unit 32 to "strong", causes the ISO gain control unit 14 and the RAW/NR processing unit 32 to sequentially process the image data in the RAW buffer memory 31, and stores an image $P_L$ after the processing in the buffer memory 15.

Control values of the ISO gain and the NR intensity in steps S403 to S405 are shown below. It can be said that, in steps S403 to S405, the reference image $P_O$ and the images $P_{UNDER}$ and $P_{OVER}$ obtained by the bracket imaging in the first embodiment are simulatively generated as the images $P_O$, $P_H$, and $P_L$, respectively.

TABLE 3

| Image | ISO gain | NR intensity |
|---|---|---|
| $P_H$ | 0 | Weak |
| $P_O$ | $2^{-EV_{Eq}/2}$ | Medium |
| $P_L$ | $2^{-EV_{Eq}}$ | Strong |

[Step S406] The combination processing unit 16 combines the images $P_H$, $P_O$, and $P_L$ in the buffer memory 15 and generates an HDR image in accordance with the following Equation (17). Equation (17) corresponds to Equation (5) described in the first embodiment. The combination processing unit 16 receives a set value of the ISO gain set in the steps S403 to S405 from the microcomputer 20 instead of an exposure correction value necessary in Equation (17) and executes processing conforming to Equation (17). Thresholds Th1 and Th2 satisfy a relation $0 \leq Th1 < Th2$. As the thresholds Th1 and Th2, for example, values decided in advance are used.

$$P(x, y) = \begin{cases} 2^{EV_{Eq}/2} \times P_L(x, y): & \text{(in the case of } P_0(x, y) \le Th1) \\ P_0(x, y): & \text{(in the case of } P_0(x, y) \le Th2) \\ 2^{-EV_{Eq}/2} \times P_H(x, y): & \text{(the other cases)} \end{cases} \quad (17)$$

[Steps S407 and S408] Respective kinds of processing in these steps correspond to steps S113 and S114 in FIG. 2. The HDR image generated in step S406 has the number of bits larger than that of image data to which the development processing can be applied by the development processing unit 17. Thus, at an input stage of the development processing unit 17, a gradation range and the number of data bits of the combined HDR image data are compressed and image data after the compression is developed.

It can be said that, in steps S403 to S405, the reference image $P_0$ and the images $P_{UNDER}$ and $P_{OVER}$ obtained by the bracket imaging in the first embodiment are simulatively generated as the images $P_0$, $P_H$, and $P_L$, respectively. However, since an ISO gain is adjusted instead of actually performing exposure control and noise occurs, as the ISO gain is increased, the NR intensity is increased to hold down an amount of the noise. According to such processing, in the images combined in step S406, the NR processing is applied to a high luminance area relatively weakly and detail components are kept. Conversely, since the NR processing is applied to a low frequency area relatively strongly to control a noise level and leave gradation information, a luminance range of a detected scene is expanded. Therefore, it is possible to obtain a high-quality HDR image.

FIGS. 19A to 19C are diagrams showing characteristics of brightness in the generated images $P_0$, $P_H$, and $P_L$.

In FIG. 19A, straight line $L_H$ indicates a relation between a luminance of a scene reproduced by the image $P_H$ and an amount of charge of the imaging element 12. Straight line $L_0$ indicates a relation between a luminance of a scene and an amount of charge of the imaging element 12 at the time when imaging is performed without performing exposure correction (i.e., imaging is performed under the exposure condition in step S101 or the exposure condition set in step S103 again in FIG. 2). A gradation range of an image imaged under the normal exposure condition is from the luminance $Y_{DL}$ to the luminance $Y_{DH}$. However, in the image $P_0$ obtained by correcting exposure to an under side, a gradation range on the high luminance side is expanded to the maximum luminance $Y_H$ by a luminance difference DYh. On the other hand, by reducing the noise level from Nf to Nsupp_h according to the NR processing, a gradation range on the low luminance side can be secured to a degree same as that at the time when exposure correction is not performed.

In FIG. 19B, straight line $L_0$ indicates a relation between a luminance of a scene reproduced by the image $P_0$ and an amount of charge of the imaging element 12. Since the image $P_0$ is obtained by gain-up, the original noise level Nf is high. However, the actual noise level Nsupp_0 is lower than the noise level Nf because the NR intensity is increased to "medium". For example, it is possible to control the noise level Nsupp_0 to about the noise level Nf without exposure correction shown in FIG. 19A.

In FIG. 19C, straight line $L_L$ indicates a relation between a luminance of a scene reproduced by the image $P_L$ and an amount of charge of the imaging element 12. Since the image $P_L$ is obtained by gain-up, the original noise level Nf is higher. However, the actual noise level Nsupp_l is lower than the noise level Nf because the NR intensity is increased to "strong".

Figure 20:
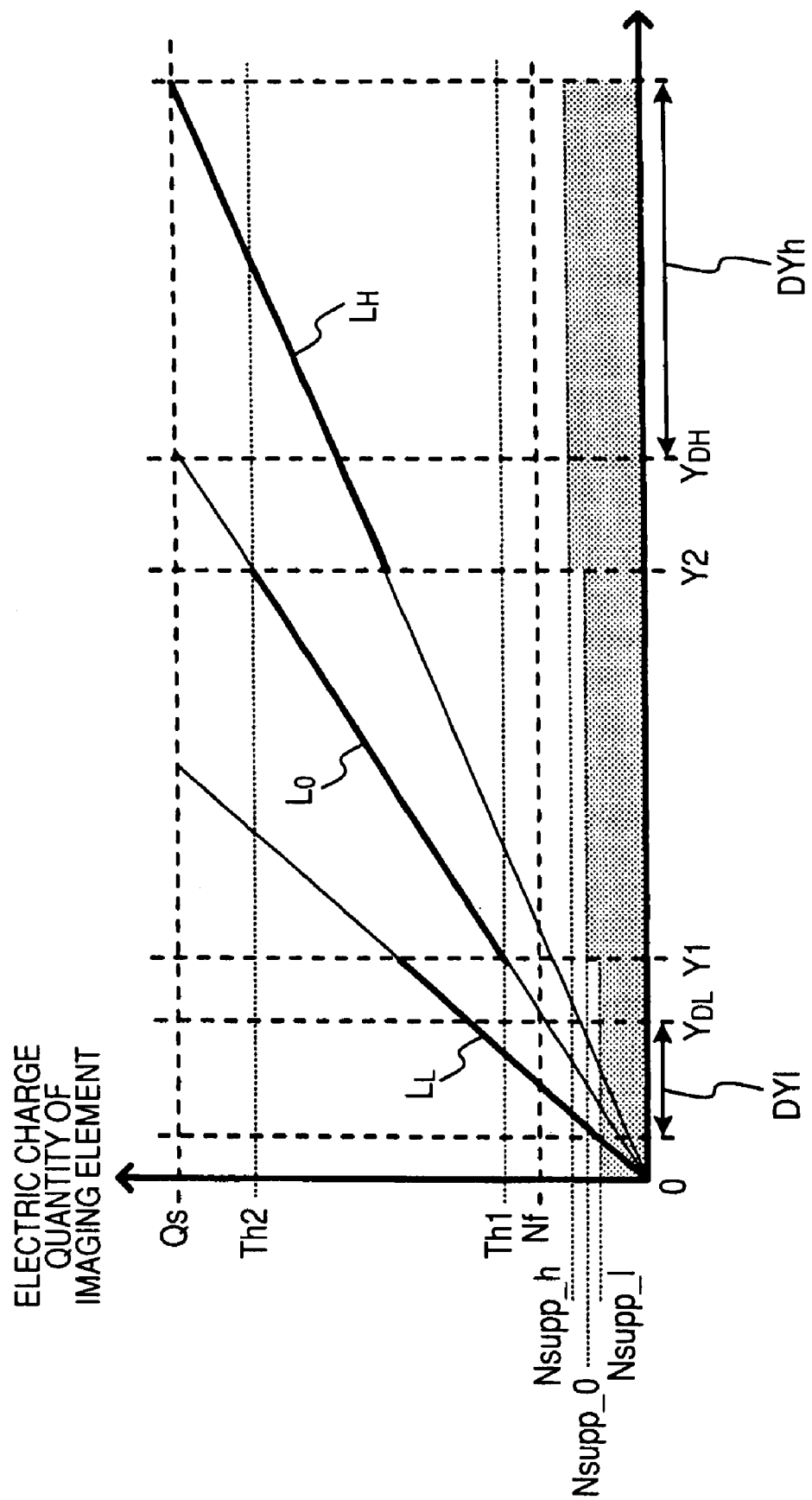
FIG. 20 is a diagram showing a characteristic of brightness in a combined image.

FIG. 20 is a diagram showing a characteristic of brightness in a combined image.

In FIG. 20, when luminances of points where the straight line $L_0$ and the thresholds Th1 and Th2 cross are Y1 and Y2, in an image after combination, pixel data of the image $P_L$ is used at a luminance equal to or lower than Y1 and pixel data of the image $P_H$ is used at a luminance equal to or higher than Y2. As explained with reference to FIG. 4, tilts of the straight lines $L_L$ and $L_H$ are the same as that of the straight line $L_0$ in areas of luminances equal to or lower than Y1 and equal to or higher than Y2, respectively, in the calculation in Equation (17). Since the tilt of the straight line $L_L$ is converted to be gentle, the noise level Nsupp_l in the image $P_L$ decreases. In this case, because of a difference in the NR intensity, the noise level Nsupp_l after the conversion is lower than the noise level Nsupp_0 of the image $P_0$. As a result, the gradation range on the low luminance side in the image after combination is expanded by a luminance difference DYl. As described above, the gradation range on the high luminance side is also expanded by a luminance difference DYh. Therefore, it is possible to generate an HDR image having gradation information in a luminance range in the scene wider than that of the image imaged without performing exposure correction.

In the processing procedure explained above, the combination processing for an HDR image by interpolation explained in the third embodiment (corresponding to steps S307 to S310 in FIG. 10) may be used instead of the processing in steps S407 to S408. In this case, for example, in FIG. 9, when three images are generated from an image after A/D conversion (corresponding to the image in the RAW buffer memory 31 in FIG. 17), it is sufficient to apply the development processing by the development processing unit 17a to the image, store respective data of images $P'_0$, $P'_H$, and $P'_L$ after the development in the buffer memory 15a, and a combined image is generated by interpolation processing. In other words, the NR processing in the RAW/NR processing unit 32 can be executed by the functions in the development processing unit 17a. Therefore, compared with the development processing applied to the HDR image after the combination by the DSC having the structure shown in FIG. 17, it is possible to further improve a quality of a final image and incorporate gradation information corresponding to a wider luminance range in the scene into image data of the image.

In this case, as in the second embodiment, low-pass image data only has to be acquired without exposure correction and by performing imaging in a defocus state. Alternatively, low-pass image data may be acquired by subjecting data of one image (desirably, the image $P_0$) among three images obtained by the ISO gain control processing and the NR processing to the low-pass filter processing by an arithmetic operation.

It is also possible to realize the processing function in the sixth embodiment as a RAW development program. In this case, it is possible to store the RAW image data obtained in step S402 in a recording medium, generate the images $P_0$, $P_H$, and $P_L$ in a PC or the like later, and obtain an HDR image. In particular, it is also possible to apply the processing not only to the RAW image data obtained by the imaging of the method described above but also to RAW image data obtained by other imaging method and obtain an HDR image in which the gradation range on the low luminance side is expanded. In other words, it is possible to simulatively generate image data after the bracket imaging on the basis of one image data already imaged and obtain an HDR image on the basis of the image data. In this case, the method of using a cumulative histogram explained in the second embodiment may be applied to inputted data of one image to estimate the exposure correction value $EV_{Eq}$.

In the embodiments described above, the present invention is applied to the DSC. However, it is possible to apply the present invention not only to the DSC but also to any kind of electronic apparatuses having an imaging function.

As described above, a part of the functions of the DSCs according to the respective embodiments can be realized by a computer. In that case, a program describing processing contents of such functions is provided. The processing functions are realized on the computer by executing the program with the computer. The program describing the processing contents can be recorded on a computer-readable recording medium. As the computer-readable recording medium, there are a magnetic recording device, an optical disk, a magneto-optical recording medium, a semiconductor memory, and the like.

When the program is put into circulation, for example, a portable recording medium such as an optical disk having the program recorded therein is sold. It is also possible to store the program in a storage of a server computer and transfer the program from the server computer to other computers through a network.

The computer that executes the program stores, for example, the program recorded in the portable recording medium or the program transferred from the server computer in a storage of the computer. The computer reads the program from the storage of the computer and executes processing conforming to the program. The computer can also directly read the program from the portable recording medium and execute processing conforming to the program. Further, the computer can execute, every time the program is transferred from the server computer, processing conforming to the program received by the computer.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus that processes input image data, the image processing apparatus comprising:
    an exposure-correction-value acquiring unit that acquires exposure correction values at plural stages with respect to an exposure control value during imaging of the input image data;
    an illumination-component generating unit that generates illumination components on the basis of the input image data;
    a gain-amount calculating unit that multiplies each of plural weighting coefficients, which are set by the number of stages of the exposure correction values acquired by the exposure-correction-value acquiring unit and set according to brightness of pixels in an identical position of the illumination components such that a total value of the exposure coefficients in the pixels in the identical position is 1, with a multiplication coefficient corresponding to the exposure correction value corresponding to the weighting coefficient and adds up multiplied values to calculate a gain amount; and
    a gain applying unit that applies, for each of the pixels, the gain amount calculated by the gain-amount calculating unit to the input image data.

2. An image processing apparatus according to claim 1, wherein the exposure correction values at the plural stages acquired by the exposure-correction-value acquiring unit include a correction value 0.

3. The image processing apparatus according to claim 1, wherein the gain-amount calculating unit calculates the multiplication coefficient by performing exponentiation with 2 as a base and the corresponding exposure correction value as an exponent.

4. An image processing apparatus according to claim 1, wherein the gain-amount calculating unit sets the weighting coefficient multiplied with the multiplication coefficient corresponding to the exposure correction value for correcting exposure further to an exposure over side among the exposure correction values acquired by the exposure-correction-value acquiring unit to be larger in an area in which the illumination components are dark and to be smaller in an area in which the illumination components are bright and sets the weighting coefficient multiplied with the multiplication coefficient corresponding to the exposure correction value for correcting exposure further to an exposure under side to be smaller in the area in which the illumination components are dark and to be larger in the area in which the illumination components are bright.

5. An image processing apparatus according to claim 4, wherein the gain-amount calculating unit further sets the weighting coefficient multiplied with the multiplication coefficient corresponding to intermediate one of the exposure correction values acquired by the exposure-correction-value acquiring unit such that a luminance of the illumination components is largest in a middle area in a luminance range.

6. An image processing apparatus according to claim 5, wherein the gain-amount calculating unit detects, from a histogram indicating a frequency for each luminance of the illumination components, a first luminance corresponding to a first frequency peak present furthest on a high luminance side of the histogram, a second luminance corresponding to a second frequency peak present in an area on a luminance side lower than the first frequency peak, and a third luminance corresponding to a lowest frequency position between the first and second frequency peak, sets the weighting coefficient corresponding to the intermediate exposure correction value among the exposure correction values acquired by the exposure-correction-value acquiring unit to be maximum in a luminance area where the illumination components take the third luminance and simply decrease on both luminance sides lower and higher than the luminance area, sets the weighting coefficient corresponding to the exposure correction value for correcting exposure to the exposure under side among the exposure correction values acquired by the exposure-correction-value acquired unit to simply increase according to an increase in a luminance of the illumination components and reach a substantially maximum value at the first luminance, and sets the weighting coefficient corresponding to the exposure correction value for correcting exposure to the exposure over side among the exposure correction values acquired by the exposure-correction-value acquiring unit to simply increase according to a decrease in a luminance of the illumination components and reach a substantially maximum value at the second luminance.

7. An image processing apparatus according to claim 6, further comprising a weighting-coefficient setting unit that makes it possible to arbitrarily set, according to user operation, maximum values of the respective weighting coefficients corresponding to the exposure correction values for correcting exposure to the exposure under side and the exposure over side, respectively, among the exposure correction values acquired by the exposure-correction-value acquiring unit.

8. An image processing apparatus according to claim 6, wherein the gain-amount calculating unit simulatively calculates, by multiplying the input image data with the multiplication coefficient, reference correction image data obtained by an imaging operation to which the intermediate exposure correction value among the exposure correction values acquired by the exposure-correction-value acquiring unit is applied, under correction image data obtained by an imaging operation to which the exposure correction value for correcting exposure to the exposure under side among the exposure correction values acquired by the exposure-correction-value acquiring unit is applied, and over correction image data obtained by an imaging operation to which the exposure correction value for correcting exposure to the exposure over side among the exposure correction values acquired by the exposure-correction-value acquiring unit is applied, calculates a maximum value of the weighting coefficient corresponding to the exposure correction value applied to the under correction image data on the basis of a position of a frequency peak present furthest on a high luminance side on a histogram indicating a frequency for each luminance of each of the reference correction image data and the under correction image data and on the basis of an intermediate value of a luminance area of the illumination components, and calculates a maximum value of the weighting coefficient corresponding to the exposure correction value applied to the over correction image data on the basis of a position of a frequency peak present in an area further on a low luminance side than a frequency peak present furthest on a high luminance side on a histogram indicating a frequency for each luminance of each of the reference correction image data and the over correction image data and on the basis of the intermediate value of the luminance area of the illumination components.

9. An image processing apparatus according to claim 1, wherein the luminance-component generating unit estimates and calculates, on the basis of the input image data, image data obtained when the intermediate exposure correction value among the exposure correction values acquired by the exposure-correction-value acquiring unit is applied during imaging of the input image data and applies low-pass filter processing to the calculated image data to generate the illumination components.

10. An image processing apparatus according to claim 1, wherein the illumination-component generating unit generates the illumination components by applying low-pass filter processing to the input image data.

11. An image processing apparatus according to claim 1, wherein the exposure-correction-value acquiring unit acquires the exposure control value during the imaging of the input image data from metadata added to the input image data.

12. An image processing apparatus according to claim 1, wherein the exposure-correction-value acquiring unit calculates the exposure correction values at the plural stages on the basis of an analysis result of the input image data.

13. An image processing apparatus according to claim 12, wherein the exposure-correction-value acquiring unit calculates, on the basis of the input image data, a cumulative histogram in which a frequency for each luminance is accumulated from a low luminance side, detects, on the basis of the cumulative histogram, a luminance area corresponding to a predetermined reference cumulative frequency in which a main subject is highly likely to be present, a luminance area corresponding to one or more cumulative frequencies higher than the reference cumulative frequency, and a luminance area corresponding to one or more cumulative frequencies lower than the reference cumulative frequency, and calculates the exposure correction values at the plural stages as estimated values according to a combination of the detected respective luminance areas.

14. An image processing apparatus according to claim 13, further comprising a filter processing unit that applies low-pass filter processing to the input image data, wherein
the exposure-correction-value acquiring unit calculates the cumulative histogram on the basis of image data obtained by applying low-pass filter processing to the input image data with the filter processing unit.

15. An image processing apparatus according to claim 12, wherein the exposure-correction-value acquiring unit applies a gain for analysis to the input image data and converts a value of the gain for analysis at a limit where ratios of white void pixels and black solid pixels are equal to or lower than predetermined thresholds, respectively, into the respective exposure correction values corresponding to an under side and an over side.

16. An imaging apparatus that images an image using a solid state imaging element, the imaging apparatus comprising:
an exposure-correction-value setting unit that sets exposure correction values at plural stages with respect to a predetermined exposure control;
an illumination-component generating unit that generates illumination components on the basis of image data obtained by an imaging operation;
a gain-amount calculating unit that multiplies each of plural weighting coefficients, which are set by the number of stages of the exposure correction values acquired by the exposure-correction-value acquiring unit and set according to brightness of pixels in an identical position of the illumination components such that a total value of the exposure coefficients in the pixels in the identical position is 1, with a multiplication coefficient corresponding to the exposure correction value corresponding to the weighting coefficient and adds up multiplied values to calculate a gain amount; and
a gain applying unit that applies, for each of the pixels, the gain amount calculated by the gain-amount calculating unit to image data obtained by imaging to which the predetermined exposure control value is applied.

17. An imaging apparatus according to claim 16, further comprising:
an exposure-state judging unit that detects white void on the basis of image data obtained by an imaging operation to which the reference exposure control value is applied and judges, on the basis of a result of the detection, whether a luminance range in an angle of view fits in a detection luminance range that can be detected by the solid state imaging element; and
an exposure-correction-value calculating unit that calculates, when it is judged by the exposure-state judging unit that a luminance range of a scene does not fit in the detection luminance range, an under side exposure control value obtained by correcting the reference exposure control value such that a luminance range on a high luminance side of the scene fits in the detection luminance range, wherein the exposure-correction-value setting unit sets, with respect to the under side exposure control value, the exposure correction values at the plural stages for correcting exposure to an exposure over side.

18. An imaging apparatus according to claim 17, further comprising a filter processing unit that applies low-pass filter processing to image data obtained by an imaging operation, wherein the exposure-state judging unit and the exposure-correction-value calculating unit execute detection of white void and calculation of the under side exposure control value on the basis of image data subjected to the low-pass filter processing by the filter processing unit.

19. An imaging apparatus according to claim 17, wherein the exposure-correction-value calculating unit applies an exposure control value gradually corrected to an under side with respect to the reference exposure control value and detects a state of occurrence of white void on the basis of image data obtained by causing the imaging apparatus to execute an imaging operation every time the exposure correction value is corrected, detects a maximum luminance of a scene on the basis of a maximum exposure control value at which white void does not occur, a luminance maximum value of a pixel output under a reference exposure condition determined in advance, saturated amounts of charge of respective pixels of the solid state imaging element, and an amount of charge of a pixel of the solid state imaging element corresponding to a predetermined white level, and judges, on the basis of the detected maximum luminance of the scene, whether a luminance range of the scene is wider than the detection luminance range, and calculates, when it is judged that the luminance range of the scene is wider than the detection luminance range, the under side exposure control value obtained by correcting the reference exposure control value such that the detected maximum luminance of the scene fits in the detection luminance range.

20. An imaging apparatus according to claim 19, further comprising a filter processing unit that applies low-pass filter processing to image data obtained by an imaging operation, wherein the exposure-correction-value calculating unit detects, on the basis of image data subjected to the low-pass filter processing by the filter processing unit, a state of occurrence of white void with respect to image data obtained by an imaging operation to which an exposure control value gradually corrected to an under side with respect to the reference exposure control value is applied.

21. An imaging apparatus according to claim 17, wherein the exposure-correction-value calculating unit detects, from image data obtained by an imaging operation to which the reference exposure control value is applied, a cumulative histogram in which a frequency for each luminance is accumulated from a low luminance side, detects, on the basis of the cumulative histogram, a luminance area corresponding to a predetermined reference cumulative frequency in which a main subject is highly likely to be present, a luminance area corresponding to one or more cumulative frequencies higher than the reference cumulative frequency, and a luminance area corresponding to one or more cumulative frequencies lower than the reference cumulative frequency, and estimates and outputs the under side exposure correction values according to a combination of the detected respective luminance areas.

22. An imaging apparatus according to claim 21, further comprising a filter processing unit that applies low-pass filter processing to image data obtained by an imaging operation, wherein the exposure-correction-value calculating unit detects, on the basis of image data subjected to the low-pass filter processing by the filter processing unit, the cumulative histogram with respect to image data obtained by an imaging operation to which the reference exposure control value is applied.

23. An imaging apparatus according to claim 17, further comprising a RAW development processing unit that applies signal processing including predetermined pixel interpolation processing and predetermined image quality correction processing to reference image data and under correction image data obtained by imaging operations to which the reference exposure control value and the under side exposure control value are applied, respectively, and converts the reference image data and the under correction image data into uncompressed image data having a number of gradation bits that can be outputted to a display device, wherein the illumination-component generating unit generates illumination components on the basis of the reference image data converted by the RAW development processing unit, and the gain applying unit applies, for each of the pixels, a gain to the under correction image data converted by the RAW development processing unit.

24. An imaging apparatus according to claim 17, wherein the illumination-component generating unit generates the illumination components by applying low-pass filter processing to image data obtained by an imaging operation to which the reference exposure control value is applied.

25. An imaging apparatus according to claim 17, wherein the illumination-component generating unit adjusts a position of a focus adjustment lens to bring an imaged image into a defocus state and uses image data obtained by an imaging operation executed by application of the reference exposure control value as the illumination components.

26. An image processing method for processing input image data, the image processing method comprising the steps of:

generating, by an illumination-component generating unit, illumination components on the basis of the input image data;

acquiring, by an exposure-correction-value acquiring unit, exposure correction values at plural stages with respect to an exposure control value during imaging of the input image data;

calculating, by a gain-amount calculating unit, a gain amount by multiplying each of plural weighting coefficients, which are set by the number of stages of the exposure correction values acquired by the exposure-correction-value acquiring unit and set according to brightness of pixels in an identical position of the illumination components such that a total value of the exposure coefficients in the pixels in the identical position is 1, with a multiplication coefficient corresponding to the exposure correction value corresponding to the weighting coefficient, and adding up multiplied values; and applying, by a gain applying unit, for each of the pixels, the gain amount calculated by the gain-amount calculating unit to the input image data.

27. A non-transitory computer readable medium storing an image processing program for processing input image data, the image processing program being executable by a computer to perform operations comprising:

acquiring exposure correction values at plural stages with respect to an exposure control value during imaging of the input image data;

generating illumination components on the basis of the input image data;

multiplying each of plural weighting coefficients, which are set by the number of stages of the acquired exposure correction values and set according to brightness of pixels in an identical position of the illumination components such that a total value of the exposure coefficients in the pixels in the identical position is 1, with a multiplication coefficient corresponding to the exposure correction value corresponding to the weighting coefficient and adding up multiplied values to calculate a gain amount; and applying, for each of the pixels, the calculated gain amount to the input image data.

* * * * *